(12) United States Patent
Song et al.

(10) Patent No.: US 12,275,292 B2
(45) Date of Patent: Apr. 15, 2025

(54) THERMAL MANAGEMENT SYSTEM FOR VEHICLE

(71) Applicants: HYUNDAI MOTOR COMPANY, Seoul (KR); KIA CORPORATION, Seoul (KR); DOOWON CLIMATE CONTROL CO., LTD, Asan-si (KR)

(72) Inventors: Jae Hyun Song, Seoul (KR); Jong Moon Won, Hwaseong-si (KR); Tae Han Kim, Seoul (KR); Chul Min Kim, Asan-si (KR); Gang Jong Lee, Cheonan-si (KR)

(73) Assignees: HYUNDAI MOTOR COMPANY, Seoul (KR); KIA CORPORATION, Seoul (KR); DOOWON CLIMATE CONTROL CO., LTD, Asan-si (KR)

( * ) Notice: Subject to any disclaimer, the term of this patent is extended or adjusted under 35 U.S.C. 154(b) by 238 days.

(21) Appl. No.: 17/943,391

(22) Filed: Sep. 13, 2022

(65) Prior Publication Data

US 2023/0331067 A1    Oct. 19, 2023

(30) Foreign Application Priority Data

Apr. 19, 2022    (KR) .................. 10-2022-0048374

(51) Int. Cl.
*B60H 1/32* (2006.01)
*B60H 1/00* (2006.01)

(52) U.S. Cl.
CPC ..... *B60H 1/32284* (2019.05); *B60H 1/00278* (2013.01)

(58) Field of Classification Search
CPC .................. B60H 1/32284; B60H 1/00278
See application file for complete search history.

(56) References Cited

U.S. PATENT DOCUMENTS

| 6,464,027 B1 * | 10/2002 | Dage ................. F01P 3/20 |
| | | 123/41.14 |
| 8,117,857 B2 | 2/2012 | Kelty et al. |
| 8,336,319 B2 | 12/2012 | Johnston et al. |
| 10,864,824 B2 | 12/2020 | Szkrybalo et al. |

(Continued)

FOREIGN PATENT DOCUMENTS

| JP | 2020-055342 A | 4/2020 |
| JP | 2020-097362 A | 6/2020 |

(Continued)

*Primary Examiner* — David J Teitelbaum
(74) *Attorney, Agent, or Firm* — MCDONNELL BOEHNEN HULBERT & BERGHOFF LLP

(57) ABSTRACT

A thermal management system for a vehicle includes a first refrigeration cycle thermally connected to a passenger compartment and including a first refrigerant loop, a battery cooling sub-system thermally connected to a battery and including a battery coolant loop, and a second refrigeration cycle thermally connected to the first refrigeration cycle and the battery cooling sub-system and including a second refrigerant loop. The second refrigeration cycle may include an upstream-side heat exchanger configured to selectively transfer heat between the first refrigerant loop and the second refrigerant loop, and a downstream-side heat exchanger configured to transfer heat between the battery coolant loop and the second refrigerant loop.

10 Claims, 21 Drawing Sheets

(56) References Cited

U.S. PATENT DOCUMENTS

| | | | |
|---|---|---|---|
| 2009/0173336 A1* | 7/2009 | Leifer | F28D 20/021 |
| | | | 165/104.11 |
| 2011/0296855 A1 | 12/2011 | Johnston et al. | |
| 2012/0180997 A1 | 7/2012 | Johnston et al. | |
| 2012/0183815 A1 | 7/2012 | Johnston et al. | |
| 2018/0312034 A1* | 11/2018 | Koberstein | B60H 1/00271 |
| 2019/0176572 A1* | 6/2019 | Kim | B60H 1/00428 |
| 2020/0101815 A1 | 4/2020 | Kurasawa et al. | |
| 2021/0078445 A1 | 3/2021 | Szkrybalo et al. | |
| 2022/0097487 A1* | 3/2022 | Jin | B60K 11/04 |

FOREIGN PATENT DOCUMENTS

| | | |
|---|---|---|
| KR | 10-1195077 B1 | 10/2012 |
| KR | 2020-0103391 A | 9/2020 |

* cited by examiner

THERMAL MANAGEMENT SYSTEM FOR VEHICLE

CROSS REFERENCE TO RELATED APPLICATIONS

This application claims priority to and the benefit of Korean Patent Application No. 10-2022-0048374 filed in the Korean Intellectual Property Office on Apr. 19, 2022, the entire contents of which are incorporated herein by reference.

TECHNICAL FIELD

The present disclosure relates to a thermal management system for a vehicle, and more particularly, to a thermal management system for a vehicle, which is capable of improving performance in managing heat of a passenger compartment, a battery, and/or powertrain components of a vehicle.

BACKGROUND

Recently, as there is gradually increasing interest in energy efficiency and problems of environmental pollution, there is a need for development of environmental-friendly vehicles that can substantially replace internal combustion engine vehicles. The environmental-friendly vehicles are typically classified into an electric vehicle which operates by using fuel cells or electricity as a power source, and a hybrid vehicle that operates by using an engine and a battery.

The electric vehicle includes a thermal management system for a vehicle that manages heat of a passenger compartment, a battery, and/or powertrain components (an electric motor, electrical components, and the like).

The thermal management system for a vehicle in the related art thermally connects an HVAC sub-system and a battery cooling sub-system, thereby improving the performance in heating the passenger compartment by using waste heat of the battery when an outside air temperature is relatively low. However, because the thermal management system is configured to satisfy both a cooling load of the passenger compartment and a cooling load of the battery, the passenger compartment and the battery cannot be efficiently cooled.

Recently, the heat-generating amount of the battery has increased to conform to the high performance of the electric vehicle and the high-speed charging of the electric vehicle. Therefore, the thermal management of the battery is considered an important factor. Accordingly, research and studies are being conducted on a thermal management system for a vehicle, which is capable of independently satisfying the cooling load of the passenger compartment and the cooling load of the battery.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a thermal management system for a vehicle, which is capable of efficiently and optimally performing thermal management on a passenger compartment, a battery, and/or powertrain components.

An exemplary embodiment of the present disclosure provides a thermal management system for a vehicle, the thermal management system including a first refrigeration cycle thermally connected to a passenger compartment and including a first refrigerant loop, a battery cooling sub-system thermally connected to a battery and including a battery coolant loop, and a second refrigeration cycle thermally connected to the first refrigeration cycle and the battery cooling sub-system and including a second refrigerant loop. The second refrigeration cycle may include an upstream-side heat exchanger configured to selectively transfer heat between the first refrigerant loop and the second refrigerant loop, and a downstream-side heat exchanger configured to transfer heat between the battery coolant loop and the second refrigerant loop.

As described above, the first refrigeration cycle is thermally connected to the second refrigeration cycle through the upstream-side heat exchanger, and the second refrigeration cycle is thermally connected to the battery cooling sub-system through the downstream-side heat exchanger. Therefore, the second refrigerant circulating through the second refrigerant loop of the second refrigeration cycle is cooled and condensed by the upstream-side heat exchanger, and the battery coolant circulating through the battery coolant loop is cooled by the downstream-side heat exchanger. Therefore, the temperature of the battery coolant may be further decreased, which may significantly improve the performance in cooling the battery.

The thermal management system according to the exemplary embodiment of the present disclosure may further include a powertrain cooling sub-system thermally connected to a powertrain component and including a powertrain coolant loop.

In the thermal management system according to the exemplary embodiment of the present disclosure, the upstream-side heat exchanger may be configured to selectively transfer heat between the first refrigerant loop, the second refrigerant loop, and the powertrain coolant loop. The upstream-side heat exchanger may include a first passageway fluidly connected to the second refrigerant loop, a second passageway fluidly connected to the first refrigerant loop, and a third passageway fluidly connected to the powertrain coolant loop. As described above, the upstream-side heat exchanger may be thermally connected to the powertrain coolant loop through the third passageway, such that the second refrigerant may be optimally cooled and condensed by the powertrain coolant circulating through the powertrain coolant loop.

The first refrigeration cycle may include a first compressor, an interior heat exchanger positioned at a downstream side of the first compressor, an exterior heat exchanger positioned at a downstream side of the interior heat exchanger, a cooling-side expansion valve positioned at a downstream side of the exterior heat exchanger, an evaporator positioned at a downstream side of the cooling-side expansion valve, and a heating-side expansion valve positioned between the interior heat exchanger and the exterior heat exchanger.

The first refrigeration cycle may further include a distribution conduit configured to connect an upstream point of the cooling-side expansion valve and a downstream point of the evaporator. The upstream-side heat exchanger may be configured to transfer heat between the distribution conduit and the second refrigerant loop.

The second passageway of the upstream-side heat exchanger may be fluidly connected to the distribution conduit. As described above, the upstream-side heat exchanger is thermally connected to the distribution conduit of the first refrigerant loop through the second passageway, such that the second refrigerant may be optimally cooled and condensed by the first refrigerant that bypasses the evaporator.

The first refrigeration cycle may further include an auxiliary expansion valve disposed in the distribution conduit and positioned at an upstream point of the second passageway of the upstream-side heat exchanger. Therefore, a portion of the first refrigerant may flow into the evaporator through the cooling-side expansion valve, and the remaining portion of the first refrigerant may flow into the second passageway of the upstream-side heat exchanger through the auxiliary expansion valve.

The thermal management system according to the exemplary embodiment of the present disclosure may further include the heating-side expansion valve positioned between the interior heat exchanger and the exterior heat exchanger. Therefore, the heating-side expansion valve may adjust a flow or flow rate of the first refrigerant flowing into the exterior heat exchanger when the HVAC sub-system performs a heating operation. The heating-side expansion valve may be configured to expand the refrigerant supplied from the interior heat exchanger when the HVAC sub-system performs the heating operation.

The downstream-side heat exchanger may include a first passageway fluidly connected to the second refrigerant loop, and a second passageway fluidly connected to the battery coolant loop. Therefore, the downstream-side heat exchanger may transfer the heat between the second refrigerant passing through the first passageway and the battery coolant passing through the second passageway. The battery coolant may be directly cooled by the second refrigerant.

The second refrigeration cycle may include a second compressor positioned at an upstream point of the upstream-side heat exchanger, and an expansion valve positioned between the upstream-side heat exchanger and the downstream-side heat exchanger.

In the thermal management system according to the exemplary embodiment of the present disclosure, the second refrigeration cycle may further include a condenser positioned between the second compressor and the upstream-side heat exchanger. Therefore, the second refrigerant may be preliminarily condensed by the condenser before the second refrigerant is condensed by the upstream-side heat exchanger, such that the efficiency in condensing the second refrigerant may be significantly improved.

The condenser may be configured to transfer heat between the powertrain coolant loop and the second refrigerant loop.

The condenser may include a first passageway fluidly connected to the second refrigerant loop, and a second passageway fluidly connected to the powertrain coolant loop. As described above, the condenser is thermally connected to the powertrain coolant loop, such that the second refrigerant may be cooled and condensed by the powertrain coolant.

The condenser may be configured to transfer heat between the battery coolant loop and the second refrigerant loop.

The condenser may include a first passageway fluidly connected to the second refrigerant loop, and a second passageway fluidly connected to the battery coolant loop. As described above, the condenser is thermally connected to the battery coolant loop, such that the second refrigerant may be cooled and condensed by the battery coolant.

The battery cooling sub-system may include a battery radiator fluidly connected to the battery coolant loop, a battery bypass conduit configured to connect an upstream point and a downstream point of the battery radiator, and a three-way valve disposed in the battery bypass conduit and configured to adjust a flow direction of a battery coolant.

The thermal management system according to the exemplary of the present disclosure may further include a first refrigerant circulating through the first refrigerant loop and a second refrigerant circulating through the second refrigerant loop. The first refrigerant may be different from the second refrigerant. The first refrigerant may be R1234yf (hydrofluoroolefin (HFO) refrigerant), and the second refrigerant may be R290. As described above, the first refrigerant and the second refrigerant are appropriately selected as different refrigerants, which may individually improve the efficiency of the first refrigeration cycle and the efficiency of the second refrigeration cycle.

Another embodiment of the present disclosure provides a thermal management system for a vehicle, the thermal management system including a first refrigeration cycle thermally connected to a passenger compartment, a battery cooling sub-system thermally connected to a battery, a second refrigeration cycle thermally connected to the first refrigeration cycle and the battery cooling sub-system, and a controller configured to control the first refrigeration cycle, the second refrigeration cycle, and the battery cooling sub-system to selectively transfer heat between the first refrigeration cycle, the second refrigeration cycle, and the battery cooling sub-system in accordance with a cooling condition of the passenger compartment, a heating condition of the passenger compartment, and a temperature of the battery.

The first refrigeration cycle may include a first compressor configured to circulate a first refrigerant, and the second refrigeration cycle may include a second compressor configured to circulate a second refrigerant. The second refrigeration cycle may include an upstream-side heat exchanger configured to thermally connect the first refrigeration cycle and the second refrigeration cycle, and a downstream-side heat exchanger configured to thermally connect the battery cooling sub-system and the second refrigeration cycle.

The controller may be configured to control the first refrigeration cycle, the second refrigeration cycle, and the battery cooling sub-system so that in a cooling condition of the passenger compartment, the first refrigerant is circulated in a cooling mode by the first compressor, a cooling-side expansion valve, and an evaporator, the second refrigerant is circulated by the second compressor, heat is transferred between the first refrigeration cycle and the second refrigeration cycle through the upstream-side heat exchanger, and heat is transferred between the second refrigeration cycle and the battery cooling sub-system through the downstream-side heat exchanger.

The controller may be configured to control the first refrigeration cycle, the second refrigeration cycle, and the battery cooling sub-system so that in a heating condition of the passenger compartment, the first refrigerant is circulated in a heating mode by the first compressor, a heating-side expansion valve, and an exterior heat exchanger, the second refrigerant is circulated by the second compressor, heat is transferred between the first refrigeration cycle and the second refrigeration cycle through the upstream-side heat exchanger, and heat is transferred between the second refrigeration cycle and the battery cooling sub-system through the downstream-side heat exchanger.

The thermal management system according to an embodiment of the present disclosure may further include a powertrain cooling sub-system thermally connected to a powertrain component, and a condenser thermally connected to the powertrain cooling sub-system and the second refrigeration cycle. The upstream-side heat exchanger may be configured to thermally connect the first refrigeration cycle, the second refrigeration cycle, and the powertrain cooling sub-system.

The controller may be configured to control the first refrigeration cycle, the second refrigeration cycle, the battery cooling sub-system, and the powertrain cooling sub-system so that in a cooling condition of the passenger compartment, the first refrigerant is circulated in a cooling mode by the first compressor, a cooling-side expansion valve, and an evaporator, the second refrigerant is circulated by the second compressor, heat is transferred between the powertrain cooling sub-system and the second refrigeration cycle through the condenser, heat is transferred between the first refrigeration cycle and the second refrigeration cycle through the upstream-side heat exchanger, and heat is transferred between the second refrigeration cycle and the battery cooling sub-system through the downstream-side heat exchanger.

The controller may be configured to control the first refrigeration cycle, the second refrigeration cycle, the battery cooling sub-system, and the powertrain cooling sub-system so that in a heating condition of the passenger compartment, the first refrigerant is circulated in a heating mode by the first compressor, a heating-side expansion valve, and an exterior heat exchanger, the second refrigerant is circulated by the second compressor, heat is transferred between the powertrain cooling sub-system and the second refrigeration cycle through the condenser, heat is transferred between the first refrigeration cycle, the second refrigeration cycle, and the powertrain cooling sub-system through the upstream-side heat exchanger, and heat is transferred between the second refrigeration cycle and the battery cooling sub-system through the downstream-side heat exchanger.

The thermal management system according to the exemplary embodiment of the present disclosure may further include, a powertrain cooling sub-system thermally connected to a powertrain component, and a condenser thermally connected to the battery cooling sub-system and the second refrigeration cycle. The upstream-side heat exchanger may be configured to thermally connect the first refrigeration cycle, the second refrigeration cycle, and the powertrain cooling sub-system.

The controller may be configured to control the first refrigeration cycle, the second refrigeration cycle, the battery cooling sub-system, and the powertrain cooling sub-system so that in a cooling condition of the passenger compartment, the first refrigerant is circulated in a cooling mode by the first compressor, a cooling-side expansion valve, and an evaporator, the second refrigerant is circulated by the second compressor, heat is transferred between the battery cooling sub-system and the second refrigeration cycle through the condenser, heat is transferred between the first refrigeration cycle, the second refrigeration cycle, and the powertrain cooling sub-system through the upstream-side heat exchanger, and heat is transferred between the second refrigeration cycle and the battery cooling sub-system through the downstream-side heat exchanger.

The controller may be configured to control the first refrigeration cycle, the second refrigeration cycle, the battery cooling sub-system, and the powertrain cooling sub-system so that in a heating condition of the passenger compartment, the first refrigerant is circulated in a heating mode by the first compressor, a heating-side expansion valve, and an exterior heat exchanger, the second refrigerant is circulated by the second compressor, heat is transferred between the powertrain cooling sub-system and the second refrigeration cycle through the condenser, heat is transferred between the first refrigeration cycle, the second refrigeration cycle, and the powertrain cooling sub-system through the upstream-side heat exchanger, and heat is transferred between the second refrigeration cycle and the battery cooling sub-system through the downstream-side heat exchanger.

According to the present disclosure, it is possible to efficiently and optimally perform the thermal management on the passenger compartment, the battery, and/or the powertrain component.

According to the present disclosure, the second refrigeration cycle, which is configured independently of the first refrigeration cycle of the HVAC sub-system, is configured to directly cool the battery coolant circulating through the battery coolant loop. Therefore, it is possible to efficiently cope with the operation of cooling the battery and the operation of the HVAC sub-system. That is, the coolant circulating through the battery coolant loop may be cooled by the first refrigeration cycle and/or the second refrigeration cycle, which makes it possible to improve the performance in cooling the battery.

According to the present disclosure, the second refrigeration cycle is thermally connected to the first refrigeration cycle of the HVAC sub-system through the upstream-side heat exchanger, and the second refrigeration cycle is thermally connected to the battery coolant loop of the battery cooling sub-system through the downstream-side heat exchanger, such that the first refrigeration cycle, the second refrigeration cycle, and the battery cooling sub-system may constitute a cascade refrigeration cycle. Therefore, the operation of the HVAC sub-system and the operation of cooling the battery pack may be simultaneously or independently performed.

In addition, the upstream-side heat exchanger of the second refrigeration cycle is thermally connected to the powertrain coolant loop, which makes it possible to significantly improve the efficiency in condensing the second refrigerant passing through the upstream-side heat exchanger.

In addition, the second refrigeration cycle may include the condenser configured to condense the second refrigerant by using the battery coolant or the powertrain coolant. Therefore, the second refrigeration cycle may implement efficient packaging.

In addition, after the load of the HVAC sub-system is stabilized, the flow rate of the first refrigerant flowing into the second passageway of the upstream-side heat exchanger may be relatively increased. Therefore, the performance of the downstream-side heat exchanger may be improved. The second refrigerant may improve the performance in cooling the battery coolant, which circulates through the battery coolant loop, through the upstream-side heat exchanger and the downstream-side heat exchanger. Therefore, the performance in cooling the battery may be further improved.

DETAILED DESCRIPTION

Figure 1:
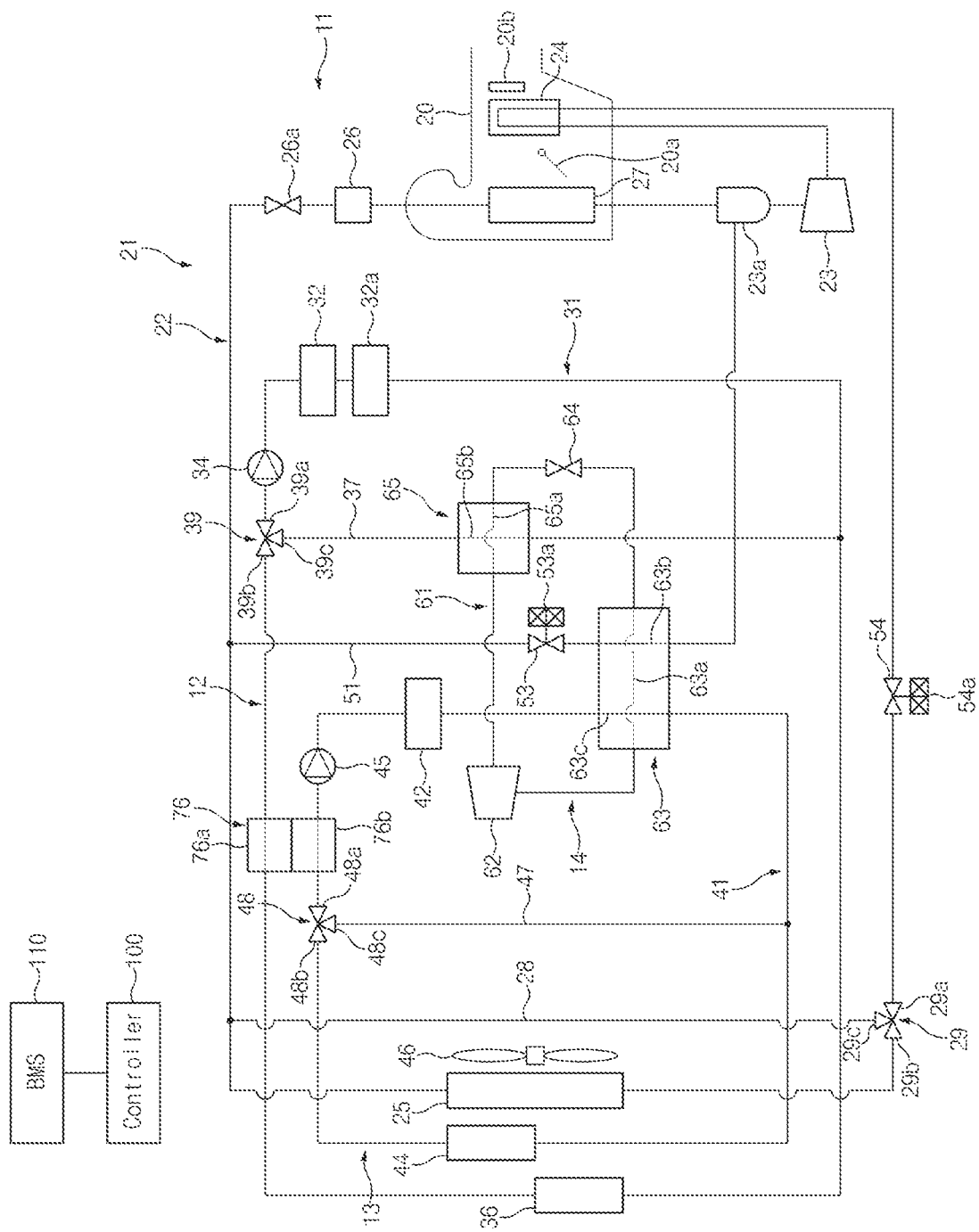
FIG. 1 is a view illustrating a thermal management system for a vehicle according to an embodiment of the present disclosure.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present disclosure, a detailed description of related publicly-known configurations or functions will be omitted when it is determined that the detailed description obscures the understanding of the embodiments of the present disclosure.

In addition, the terms first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present application.

Referring to FIG. 1, a thermal management system for a vehicle according to an embodiment of the present disclosure may include: an HVAC sub-system (HVAC sub-system) 11 thermally connected to a passenger compartment, and a battery cooling sub-system 12 thermally connected to a battery.

The HVAC sub-system 11 may include a first refrigeration cycle 21 and an HVAC casing 20. The first refrigeration cycle 21 may include a first refrigerant loop 22 configured to allow a flow of a first refrigerant. The first refrigeration cycle 21 may be thermally connected to the passenger compartment of the vehicle. Therefore, the first refrigeration cycle 21 may heat or cool air in the passenger compartment. The first refrigerant loop 22 may be fluidly connected to a first compressor 23, an interior heat exchanger 24, a heating-side expansion valve 54, an exterior heat exchanger 25, a cooling-side expansion valve 26, and an evaporator 27. Basically, the first refrigerant may sequentially pass through the first compressor 23, the interior heat exchanger 24, the heating-side expansion valve 54, the exterior heat exchanger 25, the cooling-side expansion valve 26, and the evaporator 27 through the first refrigerant loop 22. The first refrigerant loop 22 may be configured to provide various refrigerant circulation paths or various refrigerant flow paths depending on various operating modes of the thermal management system for a vehicle. For example, as described below, the first refrigerant loop 22 may exclude the exterior heat exchanger 25 when the first refrigerant flows through a bypass conduit 28. Further, the first refrigerant loop 22 may exclude the cooling-side expansion valve 26 and the evaporator 27 when the first refrigerant flows through a distribution conduit 51.

The first compressor 23 may compress the first refrigerant to circulate the first refrigerant. In particular, the first compressor 23 may be configured to compress the first refrigerant supplied from the evaporator 27. For example, the first compressor 23 may be an electric compressor configured to be operated by electrical energy.

The HVAC sub-system 11 may further include an accumulator 23a disposed at an upstream side of the first compressor 23. The accumulator 23a may be positioned between the evaporator 27 and the first compressor 23. The accumulator 23a may be configured to separate a liquid first refrigerant from the first refrigerant received from the evaporator 27, thereby preventing the liquid first refrigerant from entering the first compressor 23.

The interior heat exchanger 24 may be disposed in the HVAC casing 20. The interior heat exchanger 24 may be configured to primarily condense the first refrigerant received from the first compressor 23. Therefore, the air passing through the interior heat exchanger 24 may be heated by the interior heat exchanger 24. That is, the first refrigerant passing through the interior heat exchanger 24 may be cooled and condensed by the air passing through the HVAC casing 20.

The first refrigerant loop 22 may include the bypass conduit 28 configured to connect an upstream point of the exterior heat exchanger 25 and a downstream point of the exterior heat exchanger 25. An inlet of the bypass conduit 28 may be connected to a point between an outlet of the interior heat exchanger 24 and an inlet of the exterior heat exchanger 25. An outlet of the bypass conduit 28 may be connected to a point between an outlet of the exterior heat exchanger 25 and the expansion valve 26. That is, the bypass conduit 28 may be configured to allow the first refrigerant to bypass the exterior heat exchanger 25.

A three-way valve 29 may be disposed in the inlet of the bypass conduit 28. The three-way valve 29 may include a first port 29a fluidly connected to an outlet of the heating-side expansion valve 54, a second port 29b fluidly connected to the exterior heat exchanger 25, and a third port 29c fluidly connected to the inlet of the bypass conduit 28. The three-way valve 29 may perform a switching operation so that any one of the second port 29b and the third port 29c selectively communicates with the first port 29a. For example, when the three-way valve 29 performs the switching operation (i.e., the three-way valve 29 opens the inlet of the bypass conduit 28) so that the third port 29c communicates with the first port 29a, the first refrigerant having passed through the interior heat exchanger 24 may flow into the first compressor 23 through the bypass conduit 28. That is, when the inlet of the bypass conduit 28 is opened by the switching operation of the three-way valve 29, the first refrigerant may bypass the exterior heat exchanger 25. In this case, the first refrigerant loop 22 may be configured such that the first refrigerant circulates through the bypass conduit 28 without passing through the exterior heat exchanger 25. When the three-way valve 29 performs the switching operation (i.e., the three-way valve 29 closes the inlet of the bypass conduit 28) so that the second port 29b communicates with the first port 29a, the first refrigerant having passed through the interior heat exchanger 24 may flow into the exterior heat exchanger 25 without passing through the bypass conduit 28.

The heating-side expansion valve 54 may be disposed at a point between the interior heat exchanger 24 and the exterior heat exchanger 25. Specifically, the heating-side expansion valve 54 may be disposed at the point between the interior heat exchanger 24 and the three-way valve 29. The heating-side expansion valve 54 may adjust a flow or flow rate of the first refrigerant flowing into the exterior heat exchanger 25 or an upstream-side heat exchanger 63 of a second refrigeration cycle 14 when the HVAC sub-system 11 performs a heating operation. The heating-side expansion valve 54 may be configured to expand the first refrigerant supplied from the interior heat exchanger 24 when the HVAC sub-system 11 performs the heating operation.

For example, the heating-side expansion valve 54 may be an electronic expansion valve (EXV) having a drive motor 54a. The drive motor 54a may have a shaft configured to move to open or close an orifice defined in a valve body of the heating-side expansion valve 54. A position of the shaft may vary depending on a rotation direction and a rotation degree of the drive motor 54a, such that an opening degree of the orifice of the heating-side expansion valve 54 may vary. A controller 100 may control an operation of the drive motor 54a. The opening degree of the heating-side expansion valve 54 may be changed by the controller 100. As the opening degree of the heating-side expansion valve 54 is changed, the flow rate of the first refrigerant flowing into the exterior heat exchanger 25 may be changed. The operation of the drive motor 54a of the heating-side expansion valve 54 may be controlled by the controller 100 when the HVAC sub-system 11 performs the heating operation.

The heating-side expansion valve 54 may be a full-open-type electronic expansion valve (EXV). When the HVAC sub-system 11 operates in the cooling mode, the heating-side expansion valve 54 may be fully opened, and the heating-side expansion valve 54 is fully opened so that the opening degree of the heating-side expansion valve 54 is 100%, such that the first refrigerant is not expanded (throttled) by the heating-side expansion valve 54.

The exterior heat exchanger 25 may be disposed outside the HVAC casing 20. The exterior heat exchanger 25 may be configured to secondarily condense the first refrigerant received from the interior heat exchanger 24. The exterior heat exchanger 25 may be disposed adjacent to a front grille of the vehicle. Because the exterior heat exchanger 25 is exposed to the outside air, heat may be transferred between the exterior heat exchanger 25 and the outside air. Further, an active air flap (not illustrated) may be installed in the front grille of the vehicle so as to be openable or closable. In particular, the exterior heat exchanger 25 may exchange heat with the outside air forcibly blown by a cooling fan 46, such that a heat transfer rate between the exterior heat exchanger 25 and the outside air may increase further. The exterior heat exchanger 25 may be configured to condense the first refrigerant supplied from the interior heat exchanger 24 when the HVAC sub-system 11 performs a cooling operation. That is, when the HVAC sub-system 11 performs the cooling operation, the exterior heat exchanger 25 may transfer heat to the outside air, such that the exterior heat exchanger 25 may serve as an exterior condenser that condenses the first refrigerant. The exterior heat exchanger 25 may be configured to evaporate the first refrigerant supplied from the heating-side expansion valve 54 when the HVAC sub-system 11 performs the heating operation. That is, when the HVAC sub-system 11 performs the heating operation, the exterior heat exchanger 25 may absorb the heat from the outside air, such that the exterior heat exchanger 25 may serve as an exterior evaporator that evaporates the first refrigerant.

The cooling-side expansion valve 26 may be disposed between the exterior heat exchanger 25 and the evaporator 27. The cooling-side expansion valve 26 is disposed at an upstream side of the evaporator 27. The cooling-side expansion valve 26 may be configured to adjust a flow or flow rate of the first refrigerant flowing into the evaporator 27 and expand the first refrigerant supplied from the exterior heat exchanger 25.

According to the embodiment, the cooling-side expansion valve 26 may be a cooling-side expansion valve (thermal expansion valve (TXV)) that senses a temperature and/or pressure of the first refrigerant and adjusts an opening degree of the cooling-side expansion valve 26. Specifically, according to the embodiment, the cooling-side expansion valve 26 may be a cooling-side expansion valve having an on-off valve 26a capable of selectively blocking the flow of the first refrigerant into the cooling-side expansion valve 26. The on-off valve 26a may be a solenoid valve. The on-off valve 26a may be opened or closed by the controller 100, thereby blocking or unblocking the flow of the first refrigerant into the cooling-side expansion valve 26. The on-off valve 26a may be opened to allow the flow of the first refrigerant into the cooling-side expansion valve 26. The on-off valve 26a may be closed to block the flow of the first refrigerant into the cooling-side expansion valve 26. For example, the on-off valve 26a may be integrally mounted in a valve body of the cooling-side expansion valve 26 and configured to selectively open or close an inner flow path of the cooling-side expansion valve 26. As another example, the on-off valve 26a may be disposed at an upstream side of the cooling-side expansion valve 26 and configured to selectively open or close an inlet of the cooling-side expansion valve 26.

The evaporator 27 may be disposed at a downstream side of the cooling-side expansion valve 26 and accommodate the first refrigerant expanded by the cooling-side expansion valve 26. The evaporator 27 may be configured to cool the air by using the first refrigerant received from the cooling-side expansion valve 26.

The HVAC casing 20 may be configured to blow the air toward the passenger compartment of the vehicle. The interior heat exchanger 24 and the evaporator 27 may be disposed in the HVAC casing 20. An air mixing door 20a may be disposed between the evaporator 27 and the interior heat exchanger 24. The interior heat exchanger 24 may be disposed at a downstream side of the evaporator 27. A positive temperature coefficient (PTC) heater 20b may be disposed at a downstream side of the interior heat exchanger 24.

When the on-off valve 26a is closed, the flow of the first refrigerant into the cooling-side expansion valve 26 may be blocked, and the first refrigerant may flow only to the upstream-side heat exchanger 63 of the second refrigeration cycle 14 without flowing into the cooling-side expansion valve 26 and the evaporator 27. That is, when the on-off valve 26a is closed, the HVAC sub-system 11 does not perform the cooling operation. When the on-off valve 26a is opened, the first refrigerant may flow to the cooling-side expansion valve 26 and the evaporator 27. That is, when the on-off valve 26a is opened, the HVAC sub-system 11 may perform the cooling operation.

When the HVAC sub-system 11 operates in the cooling mode, the on-off valve 26a of the cooling-side expansion valve 26 may be opened, and the first refrigerant may circulate sequentially through the first compressor 23, the interior heat exchanger 24, the heating-side expansion valve 54, the exterior heat exchanger 25, the cooling-side expansion valve 26, and the evaporator 27. In particular, when the HVAC sub-system 11 operates in the cooling mode, the first refrigerant is compressed by the first compressor 23, the compressed first refrigerant is condensed by the interior heat exchanger 24 and the exterior heat exchanger 25, the condensed first refrigerant is expanded by the cooling-side expansion valve 26, and the expanded first refrigerant is evaporated by the evaporator 27, such that the first refrigerant may be circulated in the cooling mode by the first compressor 23, the interior heat exchanger 24, the exterior heat exchanger 25, the cooling-side expansion valve 26, and the evaporator 27.

When the HVAC sub-system 11 operates in the heating mode, the on-off valve 26a of the cooling-side expansion valve 26 may be closed, and the first refrigerant may circulate sequentially through the first compressor 23, the interior heat exchanger 24, the heating-side expansion valve 54, the exterior heat exchanger 25, and the upstream-side heat exchanger 63 of the second refrigeration cycle 14. In particular, when the HVAC sub-system 11 operates in the heating mode, the first refrigerant is compressed by the first compressor 23, the compressed first refrigerant is condensed by the interior heat exchanger 24, the condensed first refrigerant is expanded by the heating-side expansion valve 54, and the expanded first refrigerant is evaporated by the exterior heat exchanger 25, such that the first refrigerant may be circulated in the heating mode by the first compressor 23, the interior heat exchanger 24, the heating-side expansion valve 54, and the exterior heat exchanger 25.

The battery cooling sub-system 12 may be thermally connected to a battery 32. Therefore, the battery cooling sub-system 12 may cool the battery 32. The battery cooling sub-system 12 may include a battery coolant loop 31 configured to allow a flow of a battery coolant. The battery coolant loop 31 may be fluidly connected to the battery 32, a battery radiator 36, and a battery pump 34. In FIG. 1, the battery coolant may flow sequentially through the battery 32 and the battery radiator 36 through the battery coolant loop 31.

The battery 32 may have a coolant passageway provided inside or outside the battery 32. The battery coolant may pass through the coolant passageway. The battery coolant loop 31 may be fluidly connected to the coolant passageway of the battery 32.

A heater 32a may be positioned at a downstream point of the battery 32. The heater 32a may be an electric heater such as a PTC heater. When a temperature of the battery 32 is required to be increased, the heater 32a may operate. As a temperature of the battery coolant is relatively increased by the heater 32a, the battery coolant may increase the temperature of the battery 32.

The battery radiator 36 may be disposed adjacent to the front grille of the vehicle. The battery coolant passing through the battery radiator 36 may be cooled by the outside air. In particular, the battery radiator 36 may exchange heat with the outside air forcibly blown by the cooling fan 46, such that a heat transfer rate between the battery radiator 36 and the outside air may increase further.

The battery radiator 36, a powertrain radiator 44, and the exterior heat exchanger 25 may be disposed adjacent to one another at the front side of the vehicle, thereby constituting a cooling module at the front side of the vehicle. The cooling fan 46 may be disposed rearward of the exterior heat exchanger 25, the battery radiator 36, and the powertrain radiator 44.

The battery pump 34 may be disposed between the battery radiator 36 and the battery 32. The battery pump 34 may be an electric pump configured to circulate the battery coolant.

The battery cooling sub-system 12 may include a battery reservoir 76a positioned at a downstream point of the battery radiator 36. The battery reservoir 76a may be positioned between the battery radiator 36 and the battery pump 34. The battery reservoir 76a may be configured to temporarily store and supplement the battery coolant, such that a circulation flow rate of the battery coolant may be constantly maintained.

The battery cooling sub-system 12 may include a battery bypass conduit 37 configured to allow the battery coolant to bypass the battery radiator 36. The battery bypass conduit 37 may be configured to directly connect an upstream point of the battery radiator 36 and a downstream point of the battery radiator 36.

An inlet of the battery bypass conduit 37 may be connected to a point between an outlet of the heater 32a and an inlet of the battery radiator 36. An outlet of the battery bypass conduit 37 may be connected to a point between an inlet of the battery 32 and an outlet of the battery radiator 36. Specifically, the outlet of the battery bypass conduit 37 may be connected to a point between an inlet of the battery pump 34 and the outlet of the battery radiator 36. The battery coolant loop 31 may be configured such that when the battery coolant flows through the battery bypass conduit 37, the battery coolant bypasses the battery radiator 36 and the battery reservoir 76a, and the battery coolant is allowed to flow sequentially through the battery 32 and the heater 32a by the battery pump 34.

The battery cooling sub-system 12 may include a three-way valve 39 configured to adjust a flow direction of the battery coolant. The three-way valve 39 may be disposed in the outlet of the battery bypass conduit 37. That is, the three-way valve 39 may be disposed in the outlet of the battery bypass conduit 37. The three-way valve 39 may include a first port 39a fluidly connected to the battery pump 34, a second port 39b fluidly connected to the battery radiator 36, and a third port 39c fluidly connected to the battery bypass conduit 37. The three-way valve 39 may perform a switching operation so that at least two of the first port 39a, the second port 39b, and the third port 39c selectively communicate with each other or all the first port 39a, the second port 39b, and the third port 39c are closed.

When the three-way valve 39 performs the switching operation (i.e., the three-way valve 39 closes the outlet of the battery bypass conduit 37) so that the second port 39b communicates with the first port 39a, the battery coolant may flow sequentially through the battery 32, the heater 32a, and the battery radiator 36 without passing through the battery bypass conduit 37.

When the three-way valve 39 performs the switching operation (i.e., the three-way valve 39 opens the outlet of the battery bypass conduit 37) so that the third port 39c communicates with the first port 39a, the battery coolant flows through the battery bypass conduit 37, such that the battery coolant may bypass the battery radiator 36 and the battery reservoir 76a and be allowed to flow sequentially through the battery 32 and the heater 32a by the battery pump 34.

As described above, the three-way valve 39 may be configured to adjust the flow of the battery coolant. The battery pump 34 may be selectively operated by the switching operation of the three-way valve 39.

The thermal management system for a vehicle according to the embodiment of the present disclosure may include a powertrain cooling sub-system 13 thermally connected to a powertrain component 42.

The powertrain cooling sub-system 13 may include a powertrain coolant loop 41 configured to allow a flow of a powertrain coolant. The powertrain coolant loop 41 may be fluidly connected to the powertrain component 42, the powertrain radiator 44, and a powertrain pump 45. In FIG. 1, the powertrain coolant may flow sequentially through the powertrain component 42, the powertrain pump 45, and the powertrain radiator 44 through the powertrain coolant loop 41.

The powertrain component 42 may be at least one component among an electric motor, an inverter, an on-board charger (OBC), and a low dc-dc converter (LDC) that constitute an electrical powertrain system of an electric vehicle. The powertrain component 42 may have a coolant passageway provided inside or outside the powertrain component 42. The powertrain coolant may pass through the coolant passageway. The powertrain coolant loop 41 may be fluidly connected to the coolant passageway of the powertrain component 42.

The powertrain radiator 44 may be disposed adjacent to the front grille of the vehicle. The powertrain coolant passing through the powertrain radiator 44 may be cooled by the outside air. In particular, the powertrain radiator 44 may exchange heat with the outside air forcibly blown by the cooling fan 46, such that a heat transfer rate between the powertrain radiator 44 and the outside air may increase further.

The powertrain pump 45 may be disposed at an upstream side of the powertrain component 42. The powertrain pump 45 may be an electric pump configured to circulate the powertrain coolant. An operation of the powertrain pump 45 may be controlled by the controller 100.

The powertrain cooling sub-system 13 may include a powertrain reservoir 76b positioned at a downstream point of the powertrain radiator 44. The powertrain reservoir 76b may be positioned between the powertrain radiator 44 and the powertrain pump 45. The powertrain reservoir 76b may be configured to temporarily store and supplement the powertrain coolant, such that a circulation flow rate of the battery coolant may be constantly maintained.

The powertrain cooling sub-system 13 may further include a powertrain bypass conduit 47 configured to allow the powertrain coolant to bypass the powertrain radiator 44. The powertrain bypass conduit 47 may be configured to directly connect an upstream point of the powertrain radiator 44 and a downstream point of the powertrain radiator 44. In this case, the powertrain coolant loop 41 may be configured such that the powertrain coolant circulates through the powertrain bypass conduit 47 without flowing to the powertrain radiator 44.

An inlet of the powertrain bypass conduit 47 may be connected to a point between the powertrain component 42 and an inlet of the powertrain radiator 44. An outlet of the powertrain bypass conduit 47 may be connected to a point between the powertrain component 42 and an outlet of the powertrain radiator 44. Specifically, the outlet of the powertrain bypass conduit 47 may be connected to a point between the outlet of the powertrain radiator 44 and an inlet of the powertrain pump 45.

The powertrain coolant may flow from a downstream side of the powertrain component 42 to an upstream side of the powertrain pump 45 through the powertrain bypass conduit 47, such that the coolant may bypass the powertrain radiator 44. Therefore, the powertrain coolant passing through the powertrain bypass conduit 47 may be allowed to flow sequentially through the powertrain component 42 and the powertrain reservoir 76b by the powertrain pump 45.

The powertrain cooling sub-system 13 may further include a three-way valve 48 configured to adjust a flow direction of the powertrain coolant. That is, the three-way valve 48 may be disposed in the outlet of the powertrain bypass conduit 47. The three-way valve 48 may include a first port 48a fluidly connected to the inlet of the powertrain radiator 44, a second port 48b fluidly connected to the outlet of the powertrain radiator 44, and a third port 48c fluidly connected to the powertrain bypass conduit 47. The three-way valve 48 may perform a switching operation so that at least two of the first port 48a, the second port 48b, and the third port 48c selectively communicate with each other or all the first port 48a, the second port 48b, and the third port 48c are closed. For example, when the three-way valve 48 performs the switching operation (i.e., the three-way valve 48 closes the outlet of the powertrain bypass conduit 47) so that the second port 48b communicates with the first port 48a, the powertrain coolant may be allowed to flow sequentially through the powertrain component 42 and the powertrain radiator 44 by the powertrain pump 45 without passing through the powertrain bypass conduit 47. When the three-way valve 48 performs the switching operation (i.e., the three-way valve 39 performs the switching operation to open the outlet of the powertrain bypass conduit 47) so that the third port 48c communicates with the first port 48a, the powertrain coolant may flow through the powertrain bypass conduit 47 and flow sequentially through the powertrain pump 45 and the powertrain component 42. When the three-way valve 48 performs the switching operation to close all the first port 48a, the second port 48b, and the third port 48c, the powertrain coolant does not circulate through the powertrain coolant loop 41. As described above, the three-way valve 48 may be configured to adjust the flow of the powertrain coolant.

According to the embodiment, the battery reservoir 76a may be coupled integrally to the powertrain reservoir 76b, thereby constituting an integrated reservoir 76. The battery reservoir 76a and the powertrain reservoir 76b may be fluidly separated from each other by a partition or the like.

According to another embodiment, the battery reservoir 76a and the powertrain reservoir 76b may be fluidly connected to each other in the integrated reservoir 76. Therefore, the battery coolant and the powertrain coolant may be fixed in the integrated reservoir 76.

According to the embodiment illustrated in FIG. 1, the first port 48a of the three-way valve 48 may be fluidly connected to the powertrain reservoir 76b. In particular, the powertrain reservoir 76b, the powertrain pump 45, and the powertrain component 42 may be positioned at a downstream point of the first port 48a of the three-way valve 48.

The thermal management system for a vehicle according to the embodiment of the present disclosure may include the second refrigeration cycle 14 thermally connected to the HVAC sub-system 11 and the battery cooling sub-system 12. The second refrigeration cycle 14 may include a second refrigerant loop 61 configured to allow a flow of a second refrigerant. The second refrigerant loop 61 may be fluidly connected to a second compressor 62, the upstream-side heat exchanger 63, an expansion valve 64, and a downstream-side heat exchanger 65. The second refrigerant may pass sequentially through the second compressor 62, the upstream-side heat exchanger 63, the expansion valve 64, and the downstream-side heat exchanger 65 through the second refrigerant loop 61. The upstream-side heat exchanger 63 may be positioned at an upstream point of the downstream-side heat exchanger 65 based on a flow direction of the second refrigerant that circulates through the second refrigerant loop 61.

The second compressor 62 may be configured to compress the second refrigerant to circulate the second refrigerant. The second compressor 62 may be positioned at an upstream side of the upstream-side heat exchanger 63. For example, the second compressor 62 may be an electric compressor configured to be operated by electrical energy.

The first refrigeration cycle 21 of the HVAC sub-system 11 may further include the distribution conduit 51. At least a portion of the first refrigerant discharged from the exterior heat exchanger 25 flows through the distribution conduit 51, such that at least a portion of the first refrigerant may bypass the cooling-side expansion valve 26 and the evaporator 27. In this case, the first refrigerant loop 22 may be configured such that at least a portion of the first refrigerant flows through the distribution conduit 51, and the remaining portion of the first refrigerant flows through the cooling-side expansion valve 26 and the evaporator 27. Specifically, because the distribution conduit 51 connects the upstream point of the cooling-side expansion valve 26 and the downstream point of the evaporator 27, the distribution conduit 51 may be configured to allow at least a portion of the first refrigerant to bypass the cooling-side expansion valve 26 and the evaporator 27. The distribution conduit 51 may branch off from the upstream point of the on-off valve 26a of the cooling-side expansion valve 26 and merge into the point between the evaporator 27 and the first compressor 23. That is, the distribution conduit 51 may directly connect the upstream point of the on-off valve 26a and an upstream point of the first compressor 23. Therefore, the coolant passing through the distribution conduit 51 does not flow to the cooling-side expansion valve 26 and the evaporator 27. The upstream-side heat exchanger 63 and an auxiliary expansion valve 53 may be installed in the distribution conduit 51. The auxiliary expansion valve 53 may be disposed in the distribution conduit 51 and positioned at the upstream side of the upstream-side heat exchanger 63. Therefore, the first refrigerant having passed through the cooling-side expansion valve 26 may flow into the evaporator 27, and the first refrigerant having passed through the auxiliary expansion valve 53 may flow into the upstream-side heat exchanger 63. The upstream-side heat exchanger 63 and the auxiliary expansion valve 53 may be connected in parallel to the evaporator 27 and the cooling-side expansion valve 26 through the distribution conduit 51.

The first refrigeration cycle 21 may be thermally connected to the second refrigeration cycle 14 through the distribution conduit 51 and the upstream-side heat exchanger 63. That is, the upstream-side heat exchanger 63 may be configured to thermally connect the first refrigeration cycle 21 and the second refrigeration cycle 14. The upstream-side heat exchanger 63 may be configured to transfer the heat between the first refrigerant circulating through the first refrigeration cycle 21 and the second refrigerant circulating through the second refrigeration cycle 14.

According to the embodiment, the upstream-side heat exchanger 63 may be configured to thermally connect the first refrigeration cycle 21, the second refrigeration cycle 14, and the powertrain cooling sub-system 13. Specifically, the upstream-side heat exchanger 63 may include a first passageway 63a fluidly connected to the second refrigerant loop 61, a second passageway 63b fluidly connected to the first refrigerant loop 22, and a third passageway 63c fluidly connected to the powertrain coolant loop 41.

Specifically, because the second passageway 63b is fluidly connected to the distribution conduit 51 of the first refrigerant loop 22, the second passageway 63b of the upstream-side heat exchanger 63 and the evaporator 27 may be connected in parallel between the exterior heat exchanger 25 and the first compressor 23 through the distribution conduit 51. Therefore, the first refrigerant may be selectively distributed to the second passageway 63b of the upstream-side heat exchanger 63 and the evaporator 27 through the on-off valve 26a of the cooling-side expansion valve 26 and a drive motor 53a of the auxiliary expansion valve 53. The upstream-side heat exchanger 63 may be configured to transfer the heat between the distribution conduit 51 of the first refrigeration cycle 21 and the second refrigerant loop 61 of the second refrigeration cycle 14. Therefore, the upstream-side heat exchanger 63 may transfer the heat between the first refrigerant circulating through the distribution conduit 51 and the second refrigerant circulating through the second refrigerant loop 61 of the second refrigeration cycle 14.

The first passageway 63a may be positioned at an upstream point of the downstream-side heat exchanger 65 and the expansion valve 64. Specifically, the first passageway 63a may be positioned between the second compressor 62 and the expansion valve 64. The second passageway 63b may be disposed in the distribution conduit 51 and positioned between an outlet of the auxiliary expansion valve 53 and an inlet of the first compressor 23.

According to the embodiment illustrated in FIG. 1, the third passageway 63c may be positioned at a downstream point of the powertrain component 42. The third passageway 63c of the upstream-side heat exchanger 63 may be positioned between the first port 48a of the three-way valve 48 and the inlet of the powertrain radiator 44. The third passageway 63c of the upstream-side heat exchanger 63 may be positioned between an outlet of the powertrain component 42 and the inlet of the powertrain radiator 44. As described above, the upstream-side heat exchanger 63 may be thermally connected to the powertrain coolant loop 41 through the third passageway 63c, such that the second refrigerant may be optimally cooled and condensed by the powertrain coolant circulating through the powertrain coolant loop 41.

The first passageway 63a is disposed in the upstream-side heat exchanger 63 so as to be adjacent to or in contact with the second passageway 63b and the third passageway 63c, such that the first passageway 63a may be thermally connected to the second passageway 63b and the third passageway 63c, and the first passageway 63a may be fluidly separated from the second passageway 63b and the third passageway 63c.

The upstream-side heat exchanger 63 may selectively transfer the heat between the second refrigerant passing through the first passageway 63a, the first refrigerant passing through the second passageway 63b, and the powertrain coolant passing through the third passageway 63c. For example, when a temperature of the second refrigerant passing through the first passageway 63a is relatively higher than a temperature of the first refrigerant passing through the second passageway 63b, the heat is transferred from the second refrigerant passing through the first passageway 63a to the first refrigerant passing through the second passageway 63b. Therefore, the second refrigerant passing through the first passageway 63a of the upstream-side heat exchanger 63 is cooled and condensed, and the first refrigerant passing through the second passageway 63b of the upstream-side heat exchanger 63 is evaporated. When a temperature of the second refrigerant passing through the first passageway 63a is relatively higher than a temperature of the powertrain coolant passing through the third passageway 63c, the heat is transferred from the second refrigerant passing through the first passageway 63a to the powertrain coolant passing through the third passageway 63c. Therefore, the second refrigerant passing through the first passageway 63a of the upstream-side heat exchanger 63 is cooled and condensed, and the powertrain coolant passing through the third passageway 63c of the upstream-side heat exchanger 63 is heated. The first passageway 63a of the upstream-side heat exchanger 63 transfers the heat to the second passageway 63b and/or the third passageway 63c, such that the first passageway 63a of the upstream-side heat exchanger 63 may serve as a condenser. The second passageway 63b of the upstream-side heat exchanger 63 serves as an evaporator in the first refrigeration cycle 21. The third passageway 63c of the upstream-side heat exchanger 63 may absorb the heat from the first passageway 63a by means of a difference in temperature between the second refrigerant and the powertrain coolant. The upstream-side heat exchanger 63 may be an integrated heat exchanger that selectively transfers heat between the first refrigerant, the second refrigerant, and the powertrain coolant.

As the second refrigerant compressed by the second compressor 62 passes through the first passageway 63a of the upstream-side heat exchanger 63, the second refrigerant may be primarily condensed by the powertrain coolant passing through the third passageway 63c of the upstream-side heat exchanger 63 and secondarily condensed by the first refrigerant passing through the second passageway 63b of the upstream-side heat exchanger 63. That is, the second refrigerant is condensed twice by the powertrain coolant and the first refrigerant in the upstream-side heat exchanger 63, such that the efficiency in cooling and condensing the second refrigerant may be improved.

The auxiliary expansion valve 53 may be provided in the distribution conduit 51 and disposed at an upstream side of the second passageway 63b of the upstream-side heat exchanger 63. The auxiliary expansion valve 53 may adjust a flow or flow rate of the first refrigerant flowing into the second passageway 63b of the upstream-side heat exchanger 63. The auxiliary expansion valve 53 may be configured to expand the refrigerant received from the exterior heat exchanger 25. For example, the auxiliary expansion valve 53 may have the drive motor 53a. The drive motor 53a may have a shaft configured to move to open or close an inner flow path defined in a valve body of the auxiliary expansion valve 53. A position of the shaft may vary depending on a rotation direction and a rotation degree of the drive motor 53a, such that an opening degree of the inner flow path of the auxiliary expansion valve 53 may vary. The controller 100 may control an operation of the drive motor 53a. According to the embodiment, the controller 100 may be a full-automatic temperature control (FATC) system.

When the opening degree of the auxiliary expansion valve 53 is changed, a flow rate of the refrigerant flowing into the second passageway 63b of the upstream-side heat exchanger 63 may be changed. For example, when the opening degree of the auxiliary expansion valve 53 is larger than a reference opening degree, the flow rate of the refrigerant flowing into the second passageway 63b of the upstream-side heat exchanger 63 may be relatively higher than a reference flow rate. When the opening degree of the auxiliary expansion valve 53 is smaller than the reference opening degree, the flow rate of the refrigerant flowing into the second passageway 63b of the upstream-side heat exchanger 63 may be relatively equal to or lower than the reference flow rate. Because the opening degree of the auxiliary expansion valve 53 is adjusted by the controller 100, the first refrigerant may be distributed, at a constant ratio, to the evaporator 27 and the upstream-side heat exchanger 63. Therefore, the cooling operation of the HVAC sub-system 11 and the cooling operation of the upstream-side heat exchanger 63 may be simultaneously or selectively performed.

The downstream-side heat exchanger 65 may be configured to transfer the heat between the second refrigerant circulating through the second refrigeration cycle 14 and the battery coolant circulating through the battery cooling sub-system 12. That is, the downstream-side heat exchanger 65 may be configured to thermally connect the battery cooling sub-system 12 and the second refrigeration cycle 14. Specifically, the downstream-side heat exchanger 65 may be configured to transfer the heat between the second refrigerant loop 61 of the second refrigeration cycle 14 and the battery coolant loop 31 of the battery cooling sub-system 12. The downstream-side heat exchanger 65 may transfer the heat between the second refrigerant circulating through the second refrigerant loop 61 of the second refrigeration cycle 14 and the battery coolant passing through the battery coolant loop 31. Therefore, the second refrigerant is evaporated by the downstream-side heat exchanger 65, and the battery coolant may be cooled by the downstream-side heat exchanger 65. The downstream-side heat exchanger 65 may include a first passageway 65a fluidly connected to the second refrigerant loop 61 of the second refrigeration cycle 14, and a second passageway 65b fluidly connected to the battery coolant loop 31. The first passageway 65a may be positioned at a downstream point of the upstream-side heat exchanger 63. The second passageway 65b may be positioned at a downstream point of the battery 32. The first passageway 65a and the second passageway 65b are disposed in the downstream-side heat exchanger 65 so as to be adjacent to or in contact with each other, such that the first passageway 65a may be thermally connected to the second passageway 65b, and the first passageway 65a may be fluidly separated from the second passageway 65b. Therefore, the downstream-side heat exchanger 65 may transfer the heat between the second refrigerant passing through the first passageway 65a and the battery coolant passing through the second passageway 65b.

In particular, the second passageway 65b of the downstream-side heat exchanger 65 may be fluidly connected to the battery bypass conduit 37. Therefore, the downstream-side heat exchanger 65 may be disposed in the battery bypass conduit 37 of the battery coolant loop 31. As described above, the downstream-side heat exchanger 65 is disposed in the battery bypass conduit 37 of the battery coolant loop 31, such that only the battery coolant, which bypasses the battery radiator 36, may be cooled by the downstream-side heat exchanger 65. Therefore, the efficiency in cooling the battery coolant may be improved.

Because the first passageway 65a of the downstream-side heat exchanger 65 is positioned at a downstream side of the first passageway 63a of the upstream-side heat exchanger 63, the first passageway 65a of the downstream-side heat exchanger 65 may receive the second refrigerant from the first passageway 63a of the upstream-side heat exchanger 63. Because the temperature of the second refrigerant passing through the first passageway 65a is lower than the temperature of the battery coolant passing through the second passageway 65b, the second refrigerant passing through the first passageway 65a may be evaporated by the downstream-side heat exchanger 65, and the battery coolant may be cooled by the downstream-side heat exchanger 65. The battery coolant cooled by the downstream-side heat exchanger 65 is allowed to flow into the coolant passageway of the battery 32 by the battery pump 34, such that the battery 32 may be optimally cooled.

The expansion valve 64 may be positioned at an upstream side of the first passageway 65a of the downstream-side heat exchanger 65. Specifically, the expansion valve 64 may be positioned between the first passageway 63a of the upstream-side heat exchanger 63 and the first passageway 65a of the downstream-side heat exchanger 65. The expansion valve 64 may adjust a flow or flow rate of the refrigerant flowing into the first passageway 65a of the downstream-side heat exchanger 65. The expansion valve 64 may be configured to expand the refrigerant received from the upstream-side heat exchanger 63.

For example, the expansion valve 64 may be a thermostatic expansion valve. When only the operation of cooling the battery 32 is performed, the expansion valve 64 may adjust the flow rate of the second refrigerant flowing into the first passageway 65a of the downstream-side heat exchanger 65 and adjust a degree of overheat of the second refrigerant flowing out of the first passageway 65a of the downstream-side heat exchanger 65 to a predetermined value.

As another example, the expansion valve 64 may have a drive motor (not illustrated). The drive motor may have a shaft configured to move to open or close an inner flow path defined in a valve body of the expansion valve 64. A position of the shaft may vary depending on a rotation direction and a rotation degree of the drive motor, such that an opening degree of the inner flow path of the expansion valve 64 may vary. The controller 100 may control an operation of the drive motor.

In the second refrigeration cycle 14 according to the embodiment illustrated in FIG. 1, the second refrigerant is compressed by the second compressor 62, the compressed second refrigerant is condensed by the upstream-side heat exchanger 63, the condensed second refrigerant is expanded by the expansion valve 64, and the expanded second refrigerant is evaporated by the downstream-side heat exchanger 65.

The first refrigerant may cool the second refrigerant in the upstream-side heat exchanger 63, the cooled second refrigerant may cool the battery coolant in the downstream-side heat exchanger 65, and the cooled battery coolant may cool the battery 32. As described above, the second refrigeration cycle 14 is thermally connected to the first refrigeration cycle 21 of the HVAC sub-system 11 through the upstream-side heat exchanger 63 and thermally connected to the battery cooling sub-system 12 through the downstream-side heat exchanger 65, such that the first refrigeration cycle 21, the second refrigeration cycle 14, and the battery cooling sub-system 13 may constitute a cascade refrigeration cycle.

The overall operations of the HVAC sub-system 11, the battery cooling sub-system 12, the powertrain cooling sub-system 13, and the second refrigeration cycle 14 may be controlled by the controller 100. For example, the controller 100 may control the operations of the on-off valve 26a of the cooling-side expansion valve 26, the PTC heater 20b, the air mixing door 20a, the first compressor 23, the cooling fan 46, the drive motor 53a of the auxiliary expansion valve 53, the drive motor 54a of the heating-side expansion valve 54, the second compressor 62, the battery pump 34, the powertrain pump 45, and the three-way valves 39, 48, and 29, thereby appropriately heating and cooling the passenger compartment, cooling the battery 32, and cooling the powertrain component 42. According to the embodiment, the controller 100 may be a full-automatic temperature control (FATC) system.

The battery cooling sub-system 12 may be configured to be controlled by a battery management system 110. The battery management system 110 monitors a state of the battery 32. When the temperature of the battery 32 is increased to a preset temperature or higher, the battery management system 110 may perform the operation of cooling the battery 32. The battery management system 110 may transmit a command to the controller 100, the command instructing the controller 100 to perform the operation of cooling the battery 32. Therefore, the controller 100 may control the operation of the battery pump 34, the operation of the second compressor 62, the opening degree of the auxiliary expansion valve 53, and the opening degree of the expansion valve 64.

According to the embodiment, the first refrigerant may be different from the second refrigerant. For example, the first refrigerant may be R1234yf (hydrofluoroolefin (HFO) refrigerant), and the second refrigerant may be a natural refrigerant such as R290. Therefore, the efficiency of the first refrigeration cycle 21 and the efficiency of the second refrigeration cycle 14 may be individually improved.

According to another embodiment, the first refrigerant may be identical to the second refrigerant. For example, the first and second refrigerants may be R1234yf (hydrofluoroolefin (HFO) refrigerant). As another example, the first and second refrigerants may each be a natural refrigerant such as R290.

Because the thermal management system according to the embodiment of the present disclosure includes the two compressors 23 and 62, a capacity of each of the compressors 23 and 62 may be remarkably smaller than a capacity of a compressor of a thermal management system in the related art. For example, the capacity of the compressor of the thermal management system in the related art is 45 cc, whereas the capacity of the first compressor 23 and the capacity of the second compressor 62 may each be as small as 30 cc or less. In addition, because the two compressors 23 and 62 are used, the efficiency in compressing the refrigerants may be improved. In particular, the capacity of the evaporator 27 may decrease because the capacity of the first compressor 23 decreases.

According to the embodiment, the capacity of the first compressor 23 may be different from the capacity of the second compressor 62. In particular, the first compressor 23 is configured to compress the first refrigerant received from the upstream-side heat exchanger 63 and the evaporator 27. The second compressor 62 is configured to compress the second refrigerant received from the downstream-side heat exchanger 65. Therefore, the capacity of the first compressor 23 may be relatively larger than the capacity of the second compressor 62. For example, the capacity of the first compressor 23 may be 27 cc, and the capacity of the second compressor 62 may be 20 cc.

According to another embodiment, the capacity of the first compressor 23 and the capacity of the second compressor 62 may be equal to each other.

Figure 2:
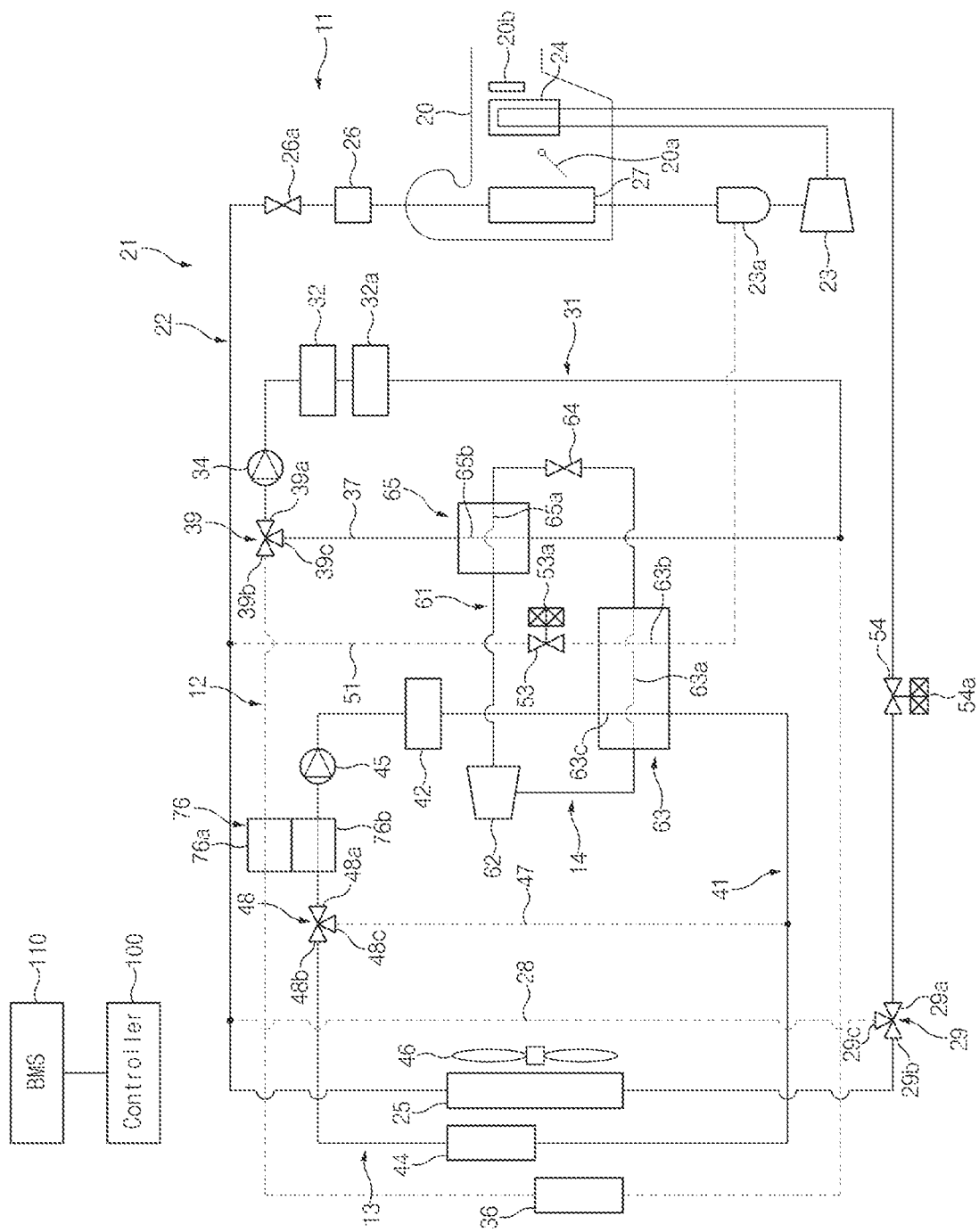
FIG. 2 is a view illustrating a state in which a battery is cooled by a second refrigeration cycle and a battery cooling sub-system, and the battery is cooled independently of an HVAC sub-system when the HVAC sub-system operates in a cooling mode in the thermal management system for a vehicle illustrated in FIG. 1.

FIG. 2 is a view illustrating a state in which the battery 32 is cooled by the second refrigeration cycle 14, the battery cooling sub-system 12, and the powertrain cooling sub-system 13 under the control of the controller 100, and the battery 32 is cooled independently of the HVAC sub-system 11 when the HVAC sub-system 11 operates in the cooling mode in the cooling condition of the passenger compartment.

Referring to FIG. 2, the three-way valve 48 of the powertrain cooling sub-system 13 performs the switching operation so that the third port 48c is closed and the second port 48b communicates with the first port 48a. That is, the three-way valve 48 performs the switching operation to close the outlet of the powertrain bypass conduit 47. In addition, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54. Because the auxiliary expansion valve 53 is closed and the first refrigerant does not pass through the second passageway 63b of the upstream-side heat exchanger 63, no heat is transferred between the second refrigerant and the first refrigerant in the upstream-side heat exchanger 63. The powertrain coolant passes through the third passageway 63c of the upstream-side heat exchanger 63, and the second refrigerant passes through the first passageway 63a of the upstream-side heat exchanger 63, such that the heat may be transferred between the powertrain coolant and the second refrigerant. Therefore, the second refrigerant may be cooled and condensed by the powertrain coolant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant cooled and condensed by the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 2, in the first refrigeration cycle 21 of the HVAC sub-system 11, the first refrigerant may be compressed by the first compressor 23, the compressed first refrigerant may be condensed by the interior heat exchanger 24 and the exterior heat exchanger 25, the condensed first refrigerant may be expanded in the cooling-side expansion valve 26, and the expanded first refrigerant may be evaporated by the evaporator 27. In the second refrigeration cycle 14, the second refrigerant may be compressed by the second compressor 62, the compressed second refrigerant may be condensed by the powertrain coolant in the upstream-side heat exchanger 63, the condensed second refrigerant may be expanded by the expansion valve 64, and the expanded second refrigerant may be evaporated by the downstream-side heat exchanger 65. Therefore, the powertrain coolant condenses the second refrigerant in the upstream-side heat exchanger 63, the second refrigerant cools the battery coolant in the downstream-side heat exchanger 65, and the cooled battery coolant cools the battery 32, such that the performance in cooling the battery 32 may be significantly improved.

Figure 3:
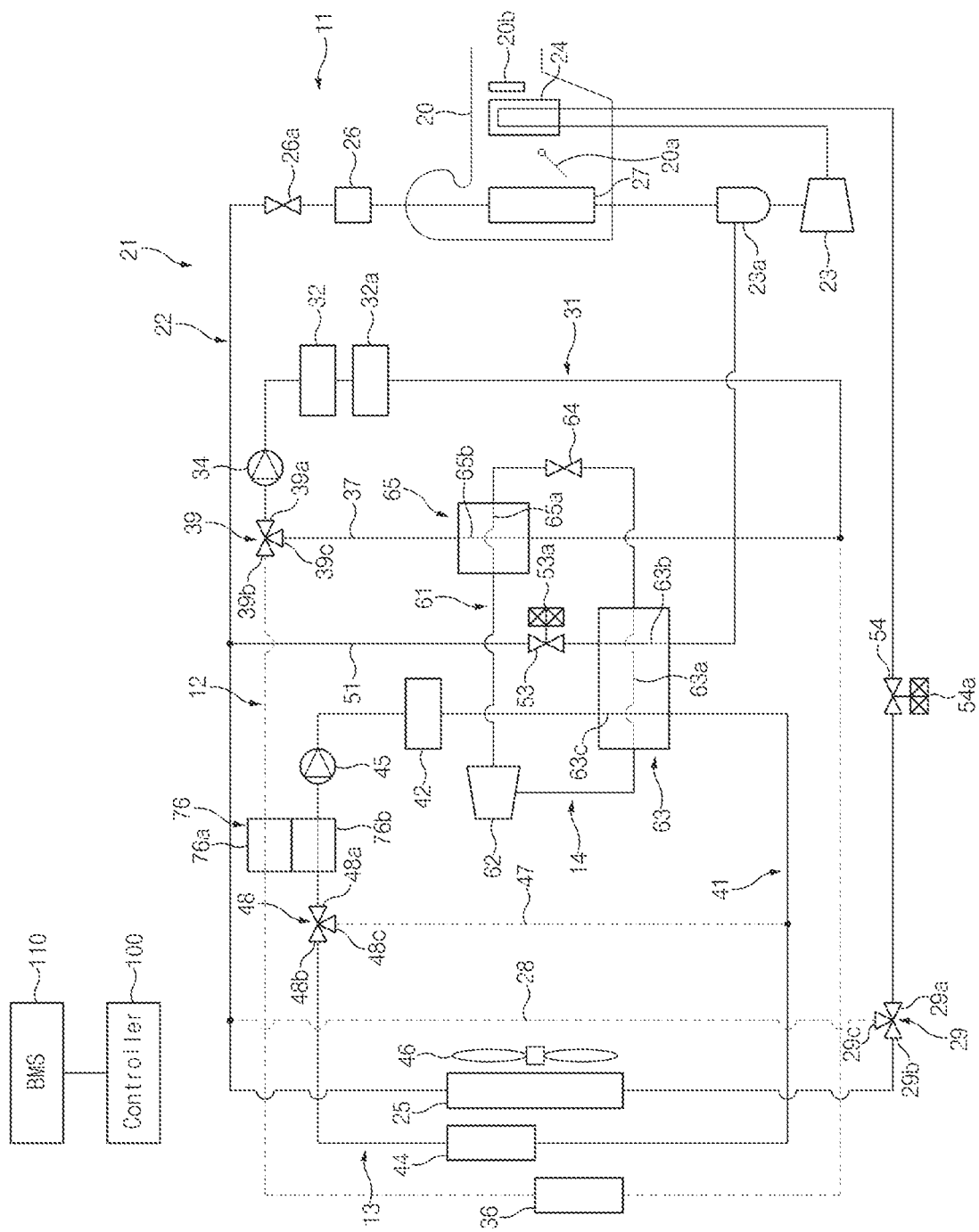
FIG. 3 is a view illustrating a state in which the battery is cooled by a first refrigeration cycle, the second refrigeration cycle, the battery cooling sub-system, and a powertrain cooling sub-system when the HVAC sub-system operates in the cooling mode in the thermal management system for a vehicle illustrated in FIG. 1.

FIG. 3 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 operates in the cooling mode in the cooling condition of the passenger compartment.

Referring to FIG. 3, the three-way valve 48 of the powertrain cooling sub-system 13 performs the switching operation so that the third port 48c is closed and the second port 48b communicates with the first port 48a. That is, the outlet of the powertrain bypass conduit 47 is closed. In addition, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54. The auxiliary expansion valve 53 is opened to have a predetermined opening degree, such that the first refrigerant is expanded by the auxiliary expansion valve 53, and the expanded first refrigerant passes through the second passageway 63b of the upstream-side heat exchanger 63. The powertrain coolant passes through the third passageway 63c of the upstream-side heat exchanger 63, the first refrigerant passes through the second passageway 63b of the upstream-side heat exchanger 63, and the second refrigerant passes through the first passageway 63a of the upstream-side heat exchanger 63, such that the heat may be transferred between the powertrain coolant, the first refrigerant, and the second refrigerant. Therefore, the second refrigerant may be cooled and condensed by the powertrain coolant and the first refrigerant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant cooled and condensed by the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 3, in the first refrigeration cycle 21 of the HVAC sub-system 11, the first refrigerant may be compressed by the first compressor 23, the compressed first refrigerant may be condensed by the interior heat exchanger 24 and the exterior heat exchanger 25, the condensed first refrigerant may be expanded by the cooling-side expansion valve 26 and the auxiliary expansion valve 53, and the expanded first refrigerant may be evaporated by the evaporator 27 and the upstream-side heat exchanger 63. In the second refrigeration cycle 14, the second refrigerant may be compressed by the second compressor 62, the compressed second refrigerant may be condensed by the first refrigerant and the powertrain coolant in the upstream-side heat exchanger 63, the condensed second refrigerant may be expanded by the expansion valve 64, and the expanded second refrigerant may be evaporated by the downstream-side heat exchanger 65. Therefore, the first refrigerant and the powertrain coolant condense the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

Figure 4:
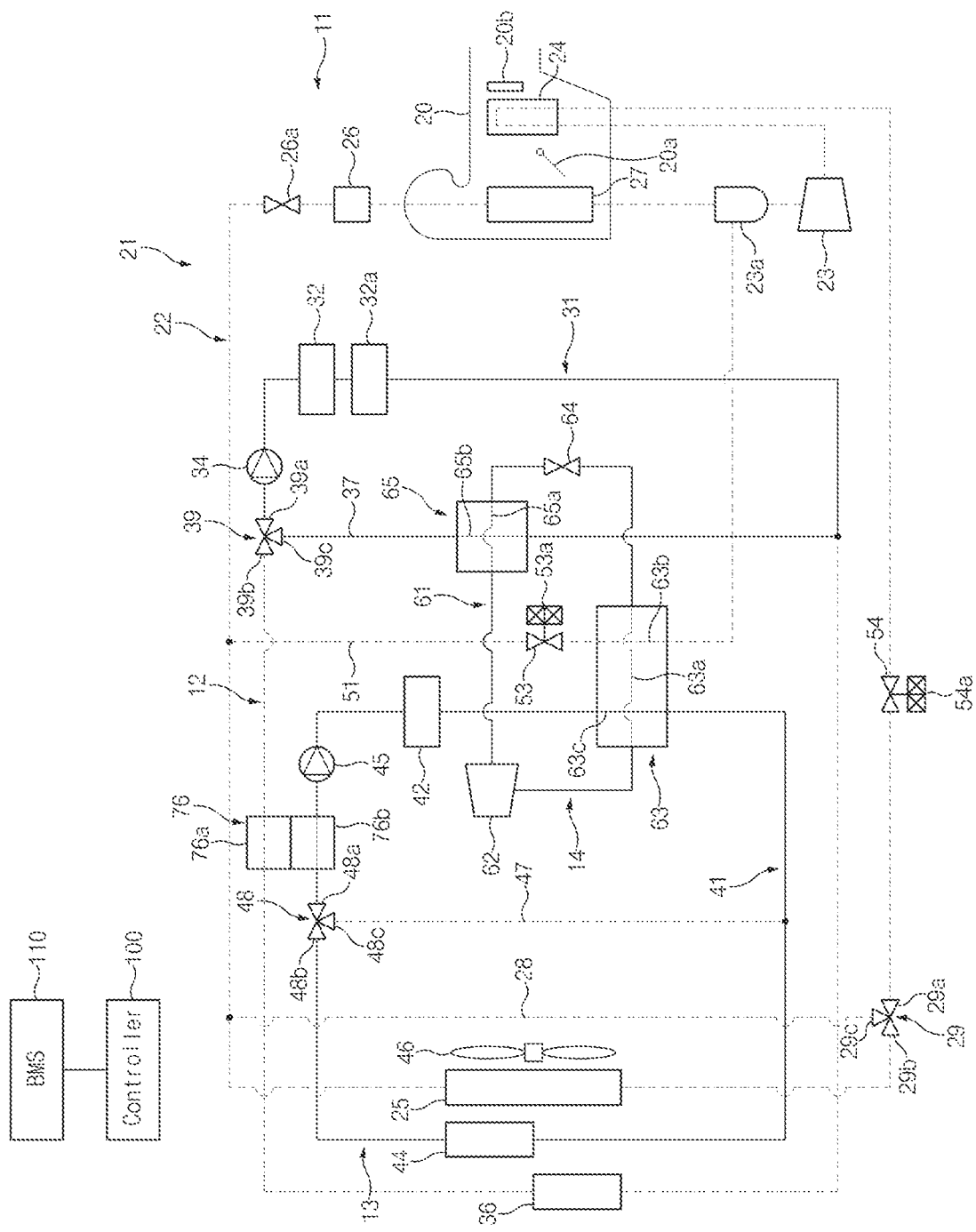
FIG. 4 is a view illustrating a state in which the battery is cooled by the second refrigeration cycle, the battery cooling sub-system, and the powertrain cooling sub-system when a first compressor of the HVAC sub-system does not operate in the thermal management system for a vehicle illustrated in FIG. 1.

FIG. 4 is a view illustrating a state in which the battery 32 is cooled by the battery cooling sub-system 12, the second refrigeration cycle 14, and the powertrain cooling sub-system 13 under the control of the controller 100 when the first compressor 23 of the HVAC sub-system 11 does not operate.

Referring to FIG. 4, the three-way valve 48 of the powertrain cooling sub-system 13 performs the switching operation so that the third port 48c is closed and the second port 48b communicates with the first port 48a. That is, the three-way valve 48 performs the switching operation to close the outlet of the battery bypass conduit 37. The operation of the first compressor 23 of the HVAC sub-system 11 is stopped, such that the first refrigerant does not circulate through the first refrigeration cycle 21. The powertrain coolant passes through the third passageway 63c of the upstream-side heat exchanger 63, and the second refrigerant passes through the first passageway 63a of the upstream-side heat exchanger 63, such that the heat may be transferred between the powertrain coolant and the second refrigerant in the upstream-side heat exchanger 63. Therefore, the second refrigerant may be cooled and condensed by the powertrain coolant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant cooled and condensed by the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 4, in the second refrigeration cycle 14, the second refrigerant may be compressed by the second compressor 62, the compressed second refrigerant may be condensed by the powertrain coolant in the upstream-side heat exchanger 63, the condensed second refrigerant may be expanded by the expansion valve 64, and the expanded second refrigerant may be evaporated by the downstream-side heat exchanger 65. Therefore, the powertrain coolant condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be improved.

Figure 5:
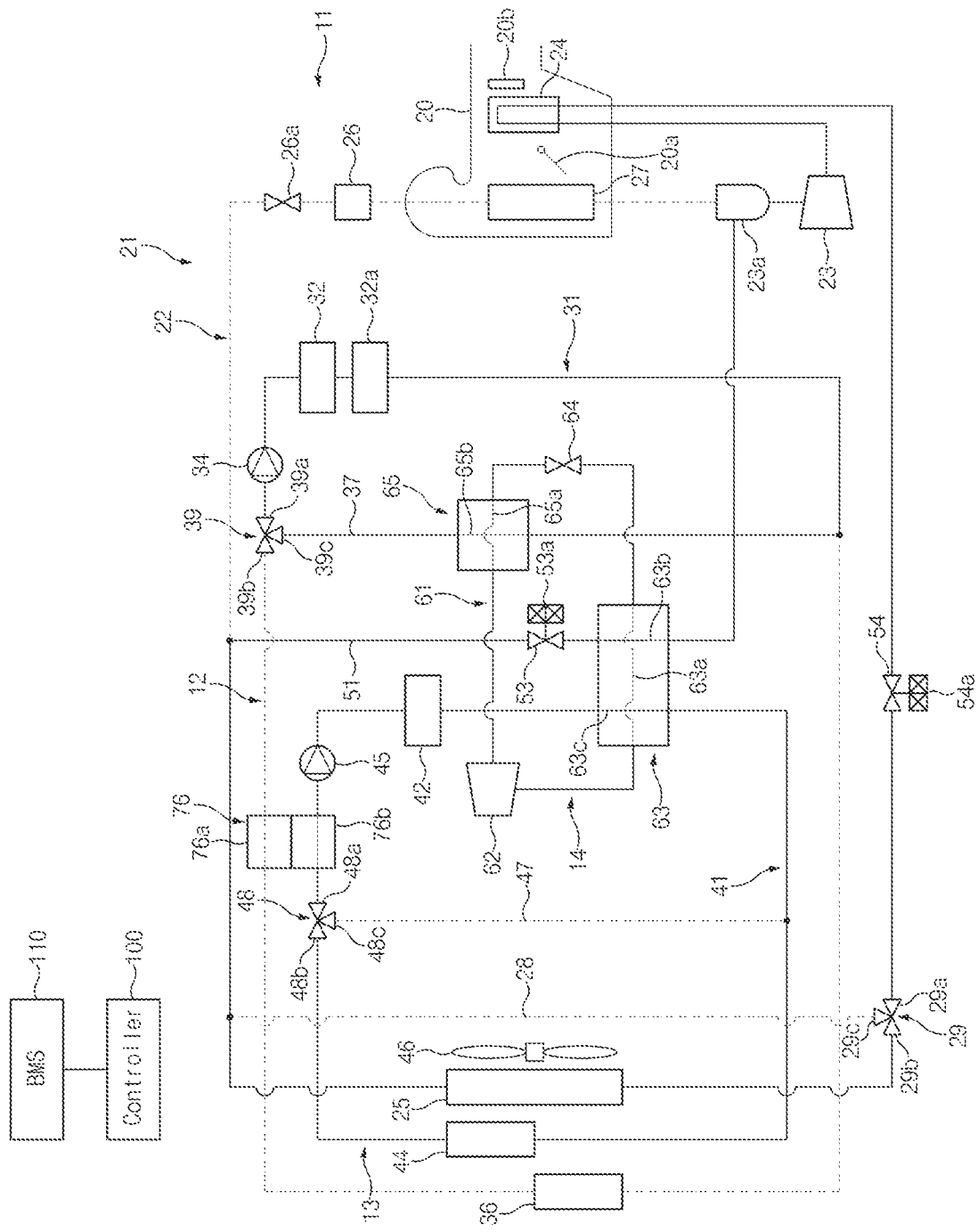
FIG. 5 is a view illustrating a state in which the battery is cooled by the first refrigeration cycle, the second refrigeration cycle, the battery cooling sub-system, and the powertrain cooling sub-system when the HVAC sub-system does not operate in the cooling mode and a heating mode in the thermal management system for a vehicle illustrated in FIG. 1.

FIG. 5 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 does not operate in the cooling mode and the heating mode.

Referring to FIG. 5, the on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The three-way valve 48 of the powertrain cooling sub-system 13 performs the switching operation so that the third port 48c is closed and the second port 48b communicates with the first port 48a. That is, the three-way valve 48 performs the switching operation to close the outlet of the battery bypass conduit 37. In addition, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54. The auxiliary expansion valve 53 is opened to have a predetermined opening degree, such that the first refrigerant may be expanded by the auxiliary expansion valve 53, and the expanded first refrigerant may pass through the second passageway 63b of the upstream-side heat exchanger 63. The powertrain coolant passes through the third passageway 63c of the upstream-side heat exchanger 63, the first refrigerant passes through the second passageway 63b of the upstream-side heat exchanger 63, and the second refrigerant passes through the first passageway 63a of the upstream-side heat exchanger 63, such that the heat may be transferred between the powertrain coolant, the first refrigerant, and the second refrigerant. Therefore, the second refrigerant may be cooled and condensed by the powertrain coolant and the first refrigerant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant cooled and condensed by the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 5, in the first refrigeration cycle 21 of the HVAC sub-system 11, the first refrigerant is compressed by the first compressor 23, and the compressed first refrigerant is condensed by the interior heat exchanger 24 and the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The condensed first refrigerant may be expanded by the auxiliary expansion valve 53, and the expanded first refrigerant may be evaporated by the upstream-side heat exchanger 63. In the second refrigeration cycle 14, the second refrigerant may be compressed by the second compressor 62, the compressed second refrigerant may be condensed by the first refrigerant and the powertrain coolant in the upstream-side heat exchanger 63, the condensed second refrigerant may be expanded by the expansion valve 64, and the expanded second refrigerant may be evaporated by the downstream-side heat exchanger 65. Therefore, the first refrigerant condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

Figure 6:
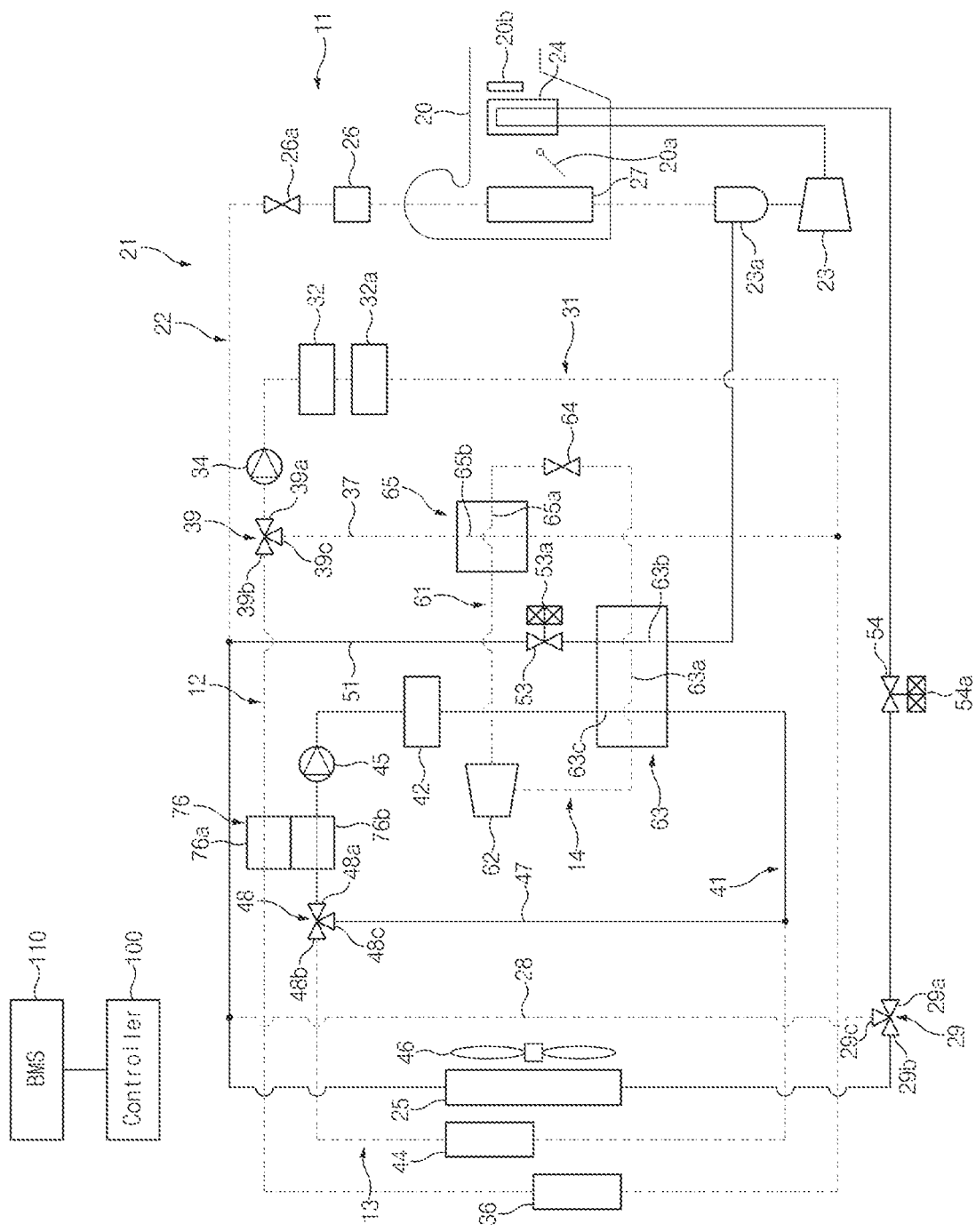
FIG. 6 is a view illustrating a state in which the battery is not cooled when the HVAC sub-system operates in the heating mode in the thermal management system for a vehicle illustrated in FIG. 1.

FIG. 6 is a view illustrating a state in which the battery 32 is not cooled when the HVAC sub-system 11 operates in the heating mode in a heating condition of the passenger compartment.

Referring to FIG. 6, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree. In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated. As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53. The operation of the battery pump 34 of the battery cooling sub-system 12 is stopped, such that the battery coolant does not circulate through the battery coolant loop 31. The three-way valve 48 of the powertrain cooling sub-system 13 performs the switching operation so that the third port 48c communicates with the first port 48a. That is, the three-way valve 48 performs the switching operation and opens the outlet of the powertrain bypass conduit 47, such that the powertrain coolant circulates through the powertrain component 42 and the third passageway 63c of the upstream-side heat exchanger 63 through the powertrain bypass conduit 47. The operation of the second compressor 62 is stopped, such that the second refrigerant does not circulate through the second refrigerant loop 61 of the second refrigeration cycle 14.

Figure 7:
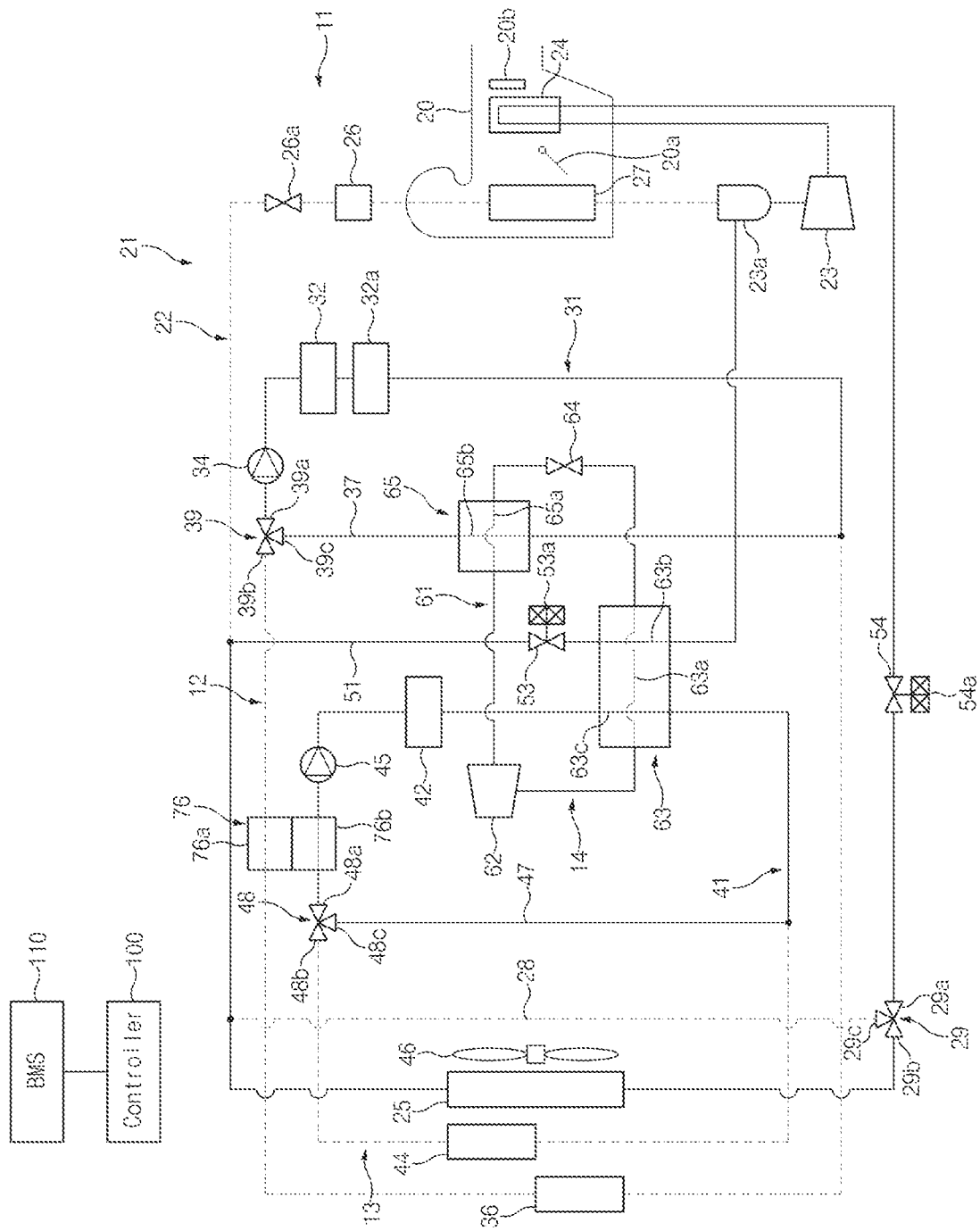
FIG. 7 is a view illustrating a state in which the battery is cooled by the battery cooling sub-system, the first refrigeration cycle, the second refrigeration cycle, and the powertrain cooling sub-system when the HVAC sub-system operates in the heating mode in the thermal management system for a vehicle illustrated in FIG. 1.

FIG. 7 is a view illustrating a state in which the battery 32 is cooled by the battery cooling sub-system 12, the first refrigeration cycle 21, the second refrigeration cycle 14, and the powertrain cooling sub-system 13 under the control of the controller 100 when the HVAC sub-system 11 operates in the heating mode in the heating condition of the passenger compartment.

Referring to FIG. 7, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree. In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated. As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The three-way valve 48 of the powertrain cooling sub-system 13 performs the switching operation so that the third port 48c communicates with the first port 48a. That is, the three-way valve 48 performs the switching operation and opens the outlet of the powertrain bypass conduit 47, such that the powertrain coolant circulates through the powertrain component 42 and the third passageway 63c of the upstream-side heat exchanger 63 through the powertrain bypass conduit 47.

In the second refrigeration cycle 14, the second refrigerant may be compressed by the second compressor 62, the compressed second refrigerant may be condensed by the first refrigerant and the powertrain coolant in the upstream-side heat exchanger 63, the condensed second refrigerant may be expanded by the expansion valve 64, and the expanded second refrigerant may be evaporated by the downstream-side heat exchanger 65. Therefore, the first refrigerant condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

Referring to FIG. 7, in the first refrigeration cycle 21 of the HVAC sub-system 11, the first refrigerant is compressed by the first compressor 23, and the compressed first refrigerant is condensed by the interior heat exchanger 24. As the opening degree of the heating-side expansion valve 26 is adjusted, the condensed first refrigerant may be expanded by the heating-side expansion valve 26, and the expanded first refrigerant may be evaporated by the exterior heat exchanger 25. In the second refrigeration cycle 14, the second refrigerant may be compressed by the second compressor 62, the compressed second refrigerant may be condensed by the first refrigerant and the powertrain coolant in the upstream-side heat exchanger 63, the condensed second refrigerant may be expanded by the expansion valve 64, and the expanded second refrigerant may be evaporated by the downstream-side heat exchanger 65. Therefore, the first refrigerant condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

FIGS. 8 to 14 are views illustrating a thermal management system for a vehicle according to another embodiment of the present disclosure.

Figure 8:
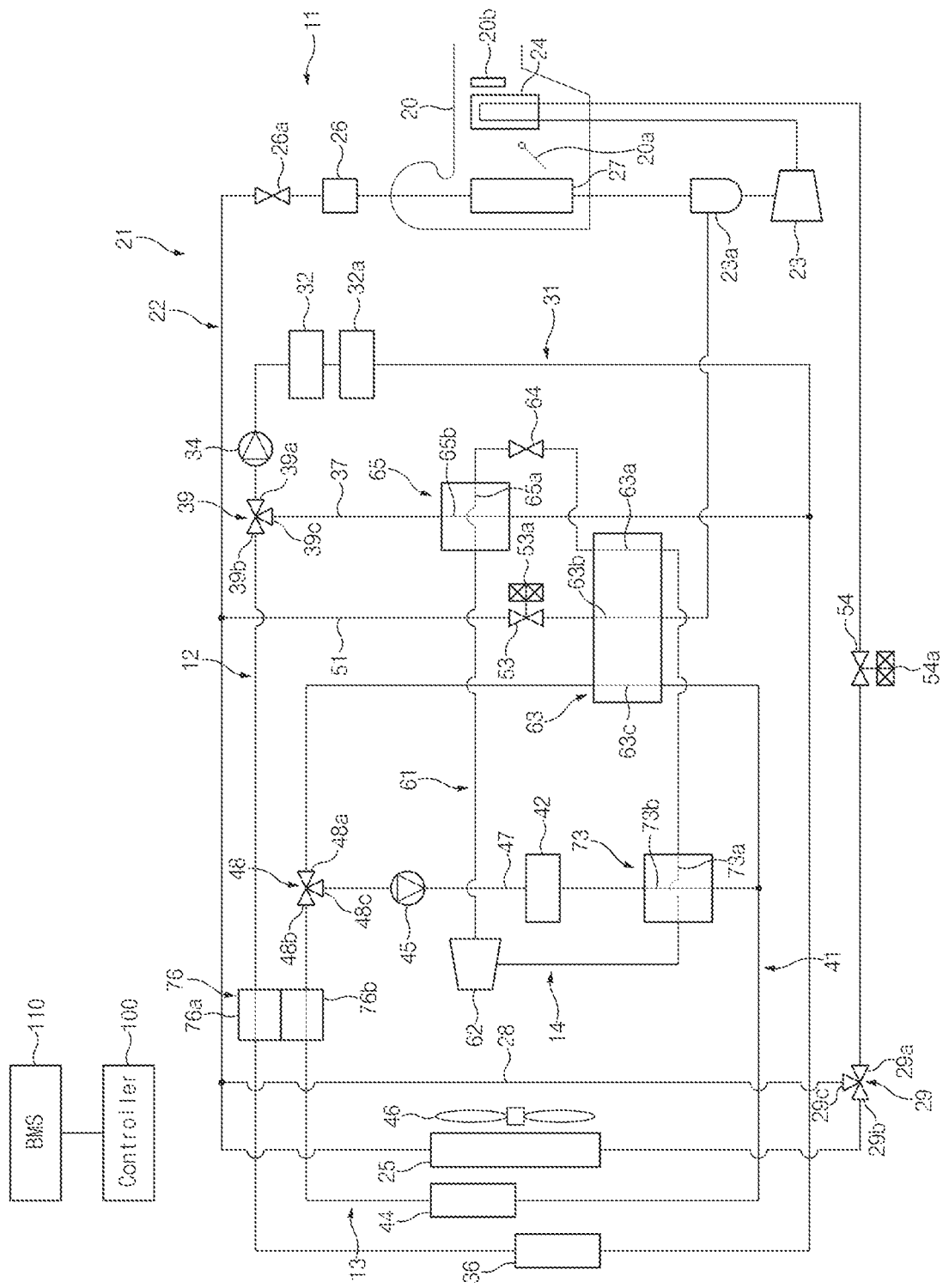
FIG. 8 is a view illustrating a thermal management system for a vehicle according to another embodiment of the present disclosure.

Referring to FIG. 8, the second refrigeration cycle 14 may further include a condenser 73 positioned between the second compressor 62 and the upstream-side heat exchanger 63. Therefore, the second refrigerant may be preliminarily condensed by the condenser 73 before the second refrigerant is condensed by the upstream-side heat exchanger 63, such that the efficiency in condensing the second refrigerant may be significantly improved.

Referring to FIG. 8, the condenser 73 may be positioned between the second compressor 62 and the upstream-side heat exchanger 63. The condenser 73 may be configured to thermally connect the powertrain cooling sub-system 13 and the second refrigeration cycle 14. Specifically, the condenser 73 may be configured to transfer the heat between the powertrain coolant circulating through the powertrain coolant loop 41 and the second refrigerant circulating through the second refrigerant loop 61. The condenser 73 may be configured to transfer the heat between the powertrain bypass conduit 47 of the powertrain coolant loop 41 and the second refrigerant loop 61 of the second refrigeration cycle 14. The condenser 73 may include a first passageway 73a fluidly connected to the second refrigerant loop 61, and a second passageway 73b fluidly connected to the powertrain bypass conduit 47. As described above, the condenser 73 is thermally connected to the powertrain coolant loop 41, such that the second refrigerant may be cooled and condensed by the powertrain coolant.

The first passageway 73a may be positioned at an upstream point of the first passageway 63a of the upstream-side heat exchanger 63. In particular, the first passageway 73a of the condenser 73 may be positioned between the second compressor 62 and the first passageway 63a of the upstream-side heat exchanger 63. The second passageway 73b may be fluidly connected to the powertrain bypass conduit 47 of the powertrain coolant loop 41. The first passageway 73a is disposed in the condenser 73 so as to be adjacent to or in contact with the second passageway 73b, such that the first passageway 73a may be thermally connected to the second passageway 73b, and the first passageway 73a may be fluidly separated from the second passageway 73b.

According to the embodiment illustrated in FIG. 8, the powertrain pump 45 and the powertrain component 42 may be disposed in the powertrain bypass conduit 47 of the powertrain coolant loop 41, and the second passageway 73b of the condenser 73 may be disposed in the powertrain bypass conduit 47 and positioned at the downstream side of the powertrain component 42.

According to the embodiment illustrated in FIG. 8, the third passageway 63c of the upstream-side heat exchanger 63 may be positioned at the downstream point of the powertrain component 42. The third passageway 63c of the upstream-side heat exchanger 63 may be positioned between the first port 48a of the three-way valve 48 and the inlet of the powertrain radiator 44.

In the second refrigeration cycle 14 according to the embodiment illustrated in FIG. 8, the second refrigerant is compressed by the second compressor 62, the compressed second refrigerant is condensed by the condenser 73 and/or the upstream-side heat exchanger 63, the condensed second refrigerant is expanded by the expansion valve 64, and the expanded second refrigerant is evaporated by the downstream-side heat exchanger 65.

Figure 9:
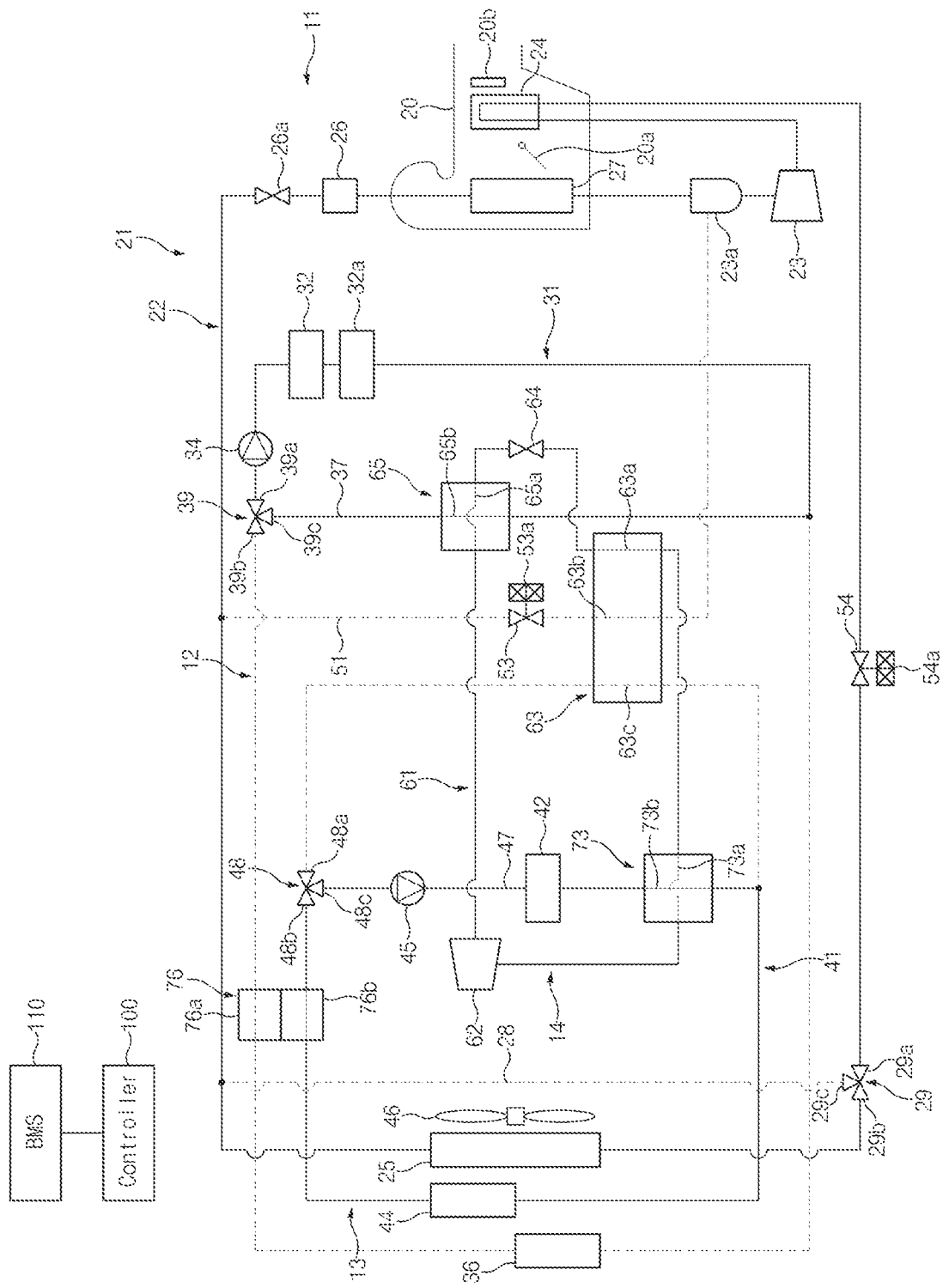
FIG. 9 is a view illustrating a state in which the battery is cooled by the second refrigeration cycle, the battery cooling sub-system, and the powertrain cooling sub-system, and the battery is cooled independently of the HVAC sub-system when the HVAC sub-system operates in the cooling mode in the thermal management system for a vehicle illustrated in FIG. 8.

FIG. 9 is a view illustrating a state in which the battery 32 is cooled by the second refrigeration cycle 14, the battery cooling sub-system 12, and the powertrain cooling sub-system 13 under the control of the controller 100, and the battery 32 is cooled independently of the HVAC sub-system 11 when the HVAC sub-system 11 operates in the cooling mode in the cooling condition of the passenger compartment.

Referring to FIG. 9, the three-way valve 48 of the powertrain cooling sub-system 13 performs the switching operation so that the first port 48a is closed and the third port 48c communicates with the second port 48b. That is, the three-way valve 48 performs the switching operation to open the outlet of the powertrain bypass conduit 47. Therefore, the powertrain coolant is circulated through the powertrain component 42 and the powertrain radiator 44 by the powertrain pump 45. The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54.

Because the auxiliary expansion valve 53 is closed and the first refrigerant does not pass through the second passageway 63b of the upstream-side heat exchanger 63, no heat is transferred between the second refrigerant and the first refrigerant in the upstream-side heat exchanger 63. As the powertrain coolant passes through the powertrain bypass conduit 47, the powertrain coolant passes through the second passageway 73b of the condenser 73 without passing through the third passageway 63c of the upstream-side heat exchanger 63. The powertrain coolant passes through the second passageway 73b of the condenser 73, and the second refrigerant passes through the first passageway 73a of the condenser 73, such that the heat may be transferred between the powertrain coolant and the second refrigerant. Therefore, the second refrigerant may be cooled and condensed by the powertrain coolant in the condenser 73. The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant cooled and condensed by the condenser 73 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 9, in the first refrigeration cycle 21 of the HVAC sub-system 11, the first refrigerant may be compressed by the first compressor 23, the compressed first refrigerant may be condensed by the interior heat exchanger 24 and the exterior heat exchanger 25, the condensed first refrigerant may be expanded in the cooling-side expansion valve 26, and the expanded first refrigerant may be evaporated by the evaporator 27.

In the second refrigeration cycle 14, the second refrigerant may be compressed by the second compressor 62, the compressed second refrigerant may be condensed by the powertrain coolant in the condenser 73, the condensed second refrigerant may be expanded by the expansion valve 64, and the expanded second refrigerant may be evaporated by the downstream-side heat exchanger 65. Therefore, the powertrain coolant condenses the second refrigerant in the condenser 73, the second refrigerant cools the battery coolant in the downstream-side heat exchanger 65, and the cooled battery coolant cools the battery 32, such that the performance in cooling the battery 32 may be significantly improved.

Figure 10:
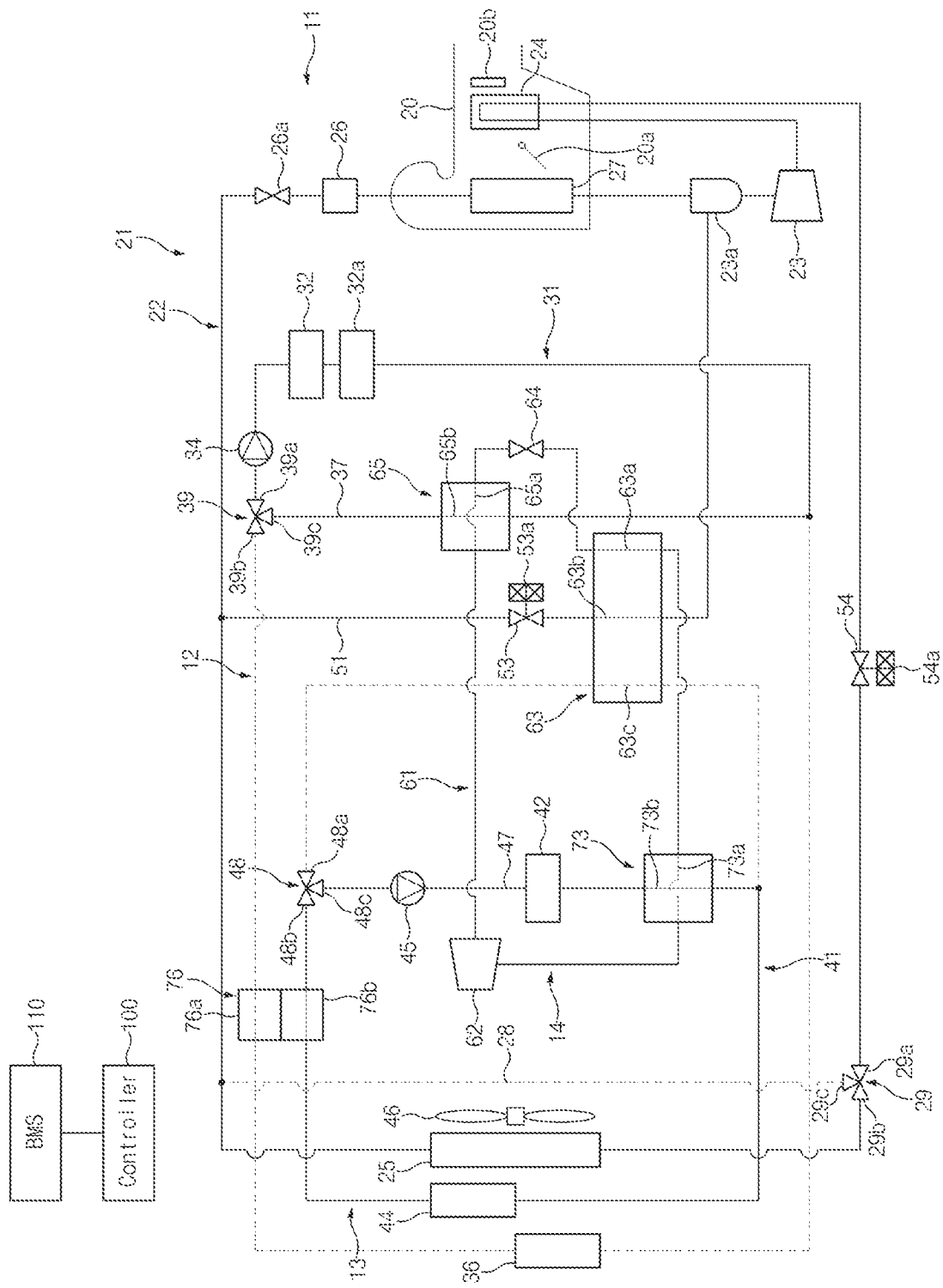
FIG. 10 is a view illustrating a state in which the battery is cooled by the first refrigeration cycle, the second refrigeration cycle, the battery cooling sub-system, and the powertrain cooling sub-system when the HVAC sub-system operates in the cooling mode in the thermal management system for a vehicle illustrated in FIG. 8.

FIG. 10 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 operates in the cooling mode in the cooling condition of the passenger compartment.

Referring to FIG. 10, the three-way valve 48 of the powertrain cooling sub-system 13 performs the switching operation so that the first port 48a is closed and the third port 48c communicates with the second port 48b. That is, the three-way valve 48 performs the switching operation and opens the outlet of the powertrain bypass conduit 47, such that the powertrain coolant is circulated through the powertrain component 42 and the powertrain radiator 44 by the powertrain pump 45, but the powertrain coolant does not pass through the third passageway 63c of the upstream-side heat exchanger 63. As the powertrain coolant passes through the powertrain bypass conduit 47, the powertrain coolant passes through the second passageway 73b of the condenser 73 without passing through the third passageway 63c of the upstream-side heat exchanger 63. The powertrain coolant passes through the second passageway 73b of the condenser 73, and the second refrigerant passes through the first passageway 73a of the condenser 73, such that the heat may be transferred between the powertrain coolant and the second refrigerant. Therefore, the second refrigerant may be cooled and condensed by the powertrain coolant in the condenser 73. The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54.

The auxiliary expansion valve 53 is opened to have a predetermined opening degree, such that the first refrigerant is expanded by the auxiliary expansion valve 53, and the expanded first refrigerant passes through the second passageway 63b of the upstream-side heat exchanger 63. The first refrigerant passes through the second passageway 63b of the upstream-side heat exchanger 63, and the second refrigerant passes through the first passageway 63a of the upstream-side heat exchanger 63, such that the heat may be transferred between the first refrigerant and the second refrigerant. Therefore, the second refrigerant may be cooled and condensed by the first refrigerant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34.

In the second refrigeration cycle 14, the second refrigerant is compressed by the second compressor 62, the compressed second refrigerant is primarily condensed by the condenser 73, the primarily condensed second refrigerant is secondarily condensed by the upstream-side heat exchanger 63, the secondarily condensed second refrigerant is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 10, in the first refrigeration cycle 21 of the HVAC sub-system 11, the first refrigerant may be compressed by the first compressor 23, the compressed first refrigerant may be condensed by the interior heat exchanger 24 and the exterior heat exchanger 25, the condensed first refrigerant may be expanded by the cooling-side expansion valve 26 and the auxiliary expansion valve 53, and the expanded first refrigerant may be evaporated by the evaporator 27 and the upstream-side heat exchanger 63. In the second refrigeration cycle 14, the second refrigerant may be compressed by the second compressor 62, the compressed second refrigerant may be sequentially condensed by the condenser 73 and the upstream-side heat exchanger 63, the condensed second refrigerant may be expanded by the expansion valve 64, and the expanded second refrigerant may be evaporated by the downstream-side heat exchanger 65. Therefore, the powertrain coolant primarily condenses the second refrigerant in the condenser 73, the first refrigerant secondarily condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

Figure 11:
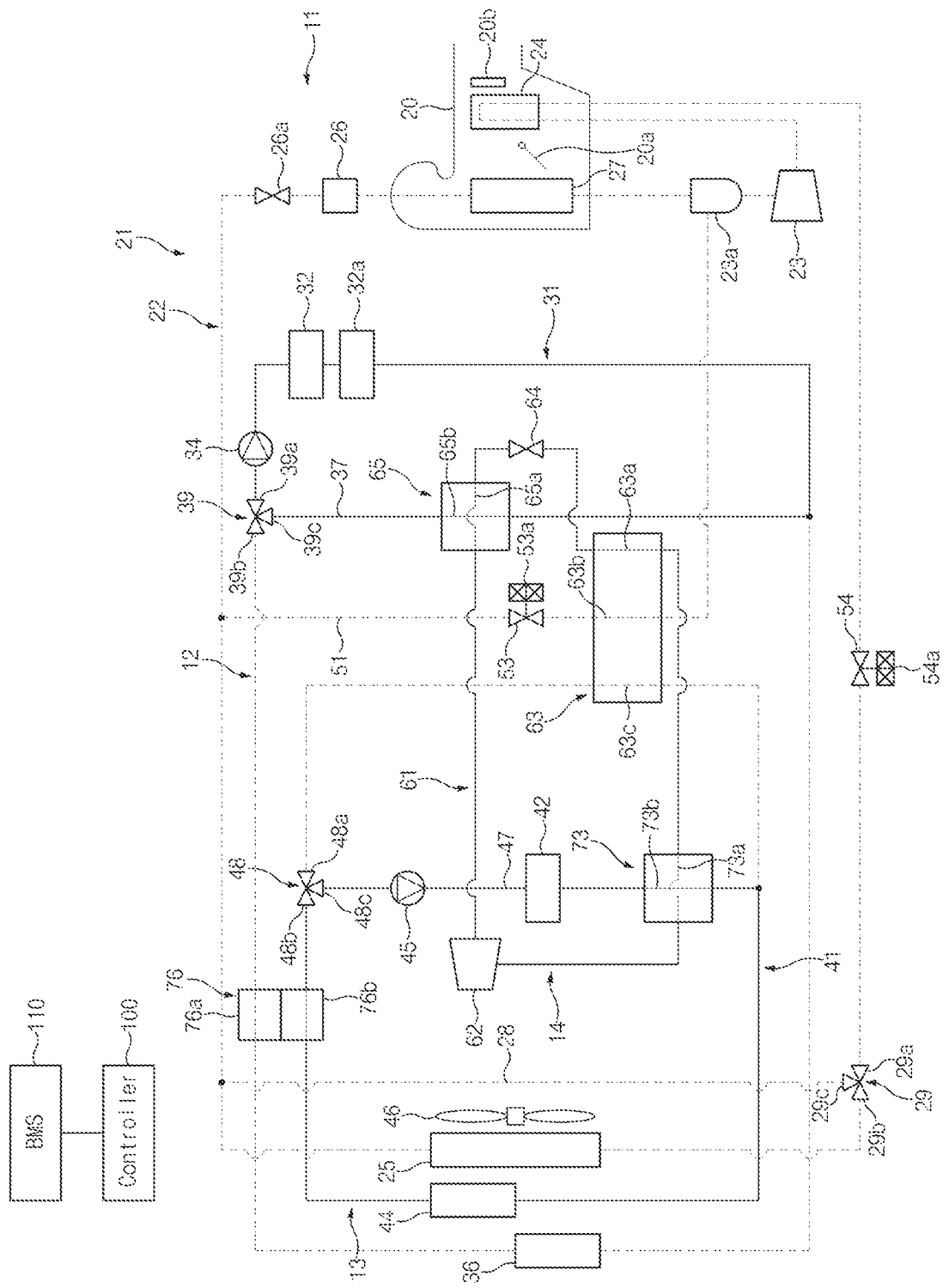
FIG. 11 is a view illustrating a state in which the battery is cooled by the second refrigeration cycle, the battery cooling sub-system, and the powertrain cooling sub-system when the first compressor of the HVAC sub-system does not operate in the thermal management system for a vehicle illustrated in FIG. 8.

FIG. 11 is a view illustrating a state in which the battery 32 is cooled by the battery cooling sub-system 12, the second refrigeration cycle 14, and the powertrain cooling sub-system 13 under the control of the controller 100 when the first compressor 23 of the HVAC sub-system 11 does not operate.

Referring to FIG. 11, the three-way valve 48 of the powertrain cooling sub-system 13 performs the switching operation so that the first port 48a is closed and the third port 48c communicates with the second port 48b. That is, the three-way valve 48 performs the switching operation and opens the outlet of the powertrain bypass conduit 47, such that the powertrain coolant is circulated through the powertrain component 42 and the powertrain radiator 44 by the powertrain pump 45. As the powertrain coolant passes through the powertrain bypass conduit 47, the powertrain coolant passes through the second passageway 73b of the condenser 73 without passing through the third passageway 63c of the upstream-side heat exchanger 63. The powertrain coolant passes through the second passageway 73b of the condenser 73, and the second refrigerant passes through the first passageway 73a of the condenser 73, such that the heat may be transferred between the powertrain coolant and the second refrigerant. Therefore, the second refrigerant may be cooled and condensed by the powertrain coolant in the condenser 73.

The operation of the first compressor 23 of the HVAC sub-system 11 is stopped, such that the first refrigerant does not circulate through the first refrigeration cycle 21. The powertrain coolant passes through the second passageway 73b of the condenser 73, and the second refrigerant passes through the first passageway 73a of the condenser 73, such that the heat may be transferred between the powertrain coolant and the second refrigerant in the condenser 73.

Therefore, the second refrigerant may be cooled and condensed by the powertrain coolant in the condenser 73. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34.

The second refrigerant cooled and condensed by the condenser 73 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 11, in the second refrigeration cycle 14, the second refrigerant may be compressed by the second compressor 62, the compressed second refrigerant may be condensed by the powertrain coolant in the condenser 73, the condensed second refrigerant may be expanded by the expansion valve 64, and the expanded second refrigerant may be evaporated by the downstream-side heat exchanger 65. Therefore, the powertrain coolant condenses the second refrigerant in the condenser 73, the second refrigerant cools the battery coolant in the downstream-side heat exchanger 65, and the cooled battery coolant cools the battery 32, such that the performance in cooling the battery coolant and the battery 32 may be improved.

Figure 12:
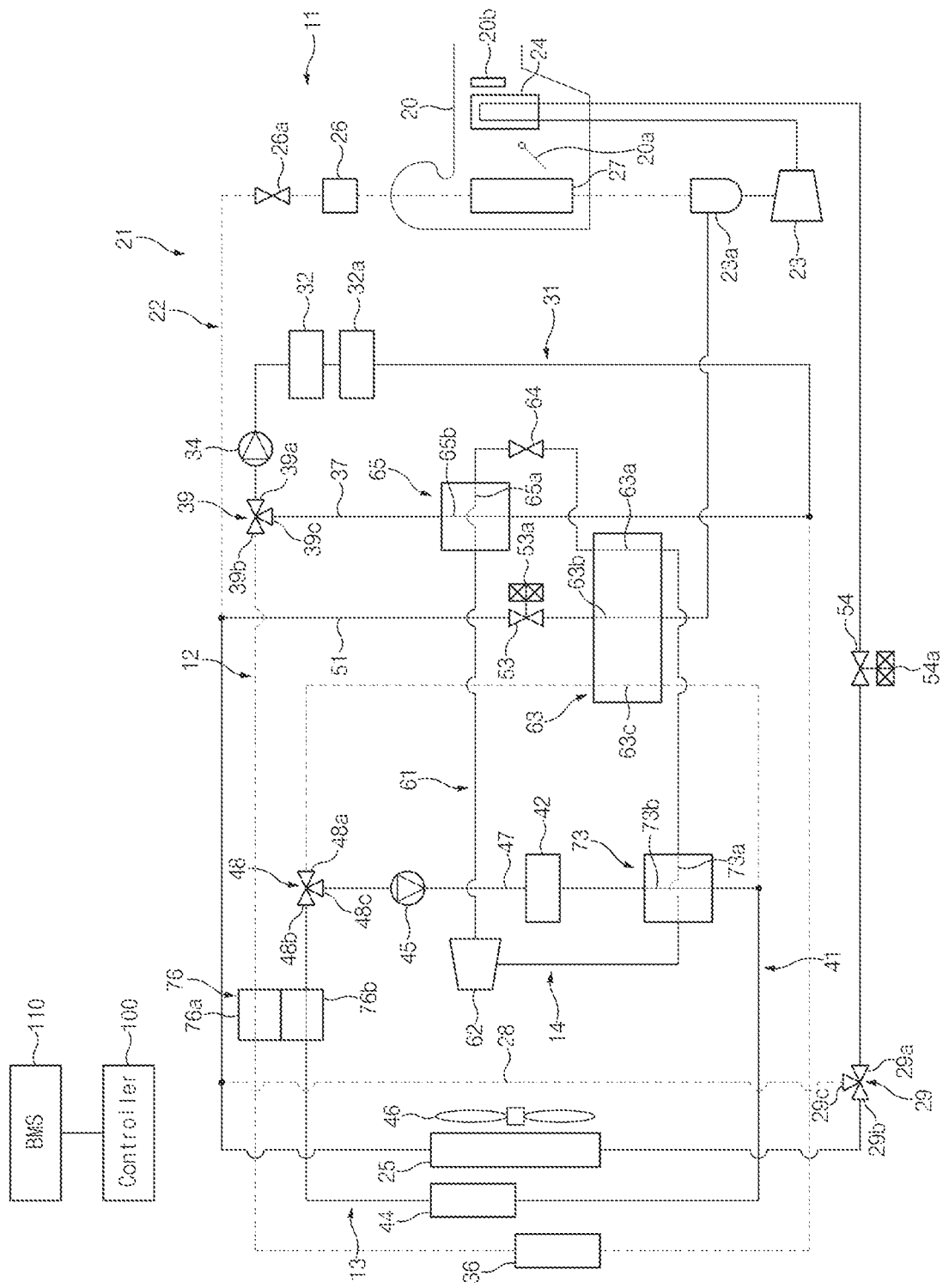
FIG. 12 is a view illustrating a state in which the battery is cooled by the first refrigeration cycle, the second refrigeration cycle, the battery cooling sub-system, and the powertrain cooling sub-system when the HVAC sub-system does not operate in the cooling mode and the heating mode in the thermal management system for a vehicle illustrated in FIG. 8.

FIG. 12 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 does not operate in the cooling mode and the heating mode.

Referring to FIG. 12, the on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The three-way valve 48 of the powertrain cooling sub-system 13 performs the switching operation so that the first port 48a is closed and the third port 48c communicates with the second port 48b. That is, the three-way valve 48 performs the switching operation and opens the outlet of the powertrain bypass conduit 47, such that the powertrain coolant is circulated through the powertrain component 42 and the powertrain radiator 44 by the powertrain pump 45. As the powertrain coolant passes through the powertrain bypass conduit 47, the powertrain coolant passes through the second passageway 73b of the condenser 73 without passing through the third passageway 63c of the upstream-side heat exchanger 63. The powertrain coolant passes through the second passageway 73b of the condenser 73, and the second refrigerant passes through the first passageway 73a of the condenser 73, such that the heat may be transferred between the powertrain coolant and the second refrigerant. Therefore, the second refrigerant may be cooled and condensed by the powertrain coolant in the condenser 73.

The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54.

The auxiliary expansion valve 53 is opened to have a predetermined opening degree, such that the first refrigerant is expanded by the auxiliary expansion valve 53, and the expanded first refrigerant passes through the second passageway 63b of the upstream-side heat exchanger 63. The first refrigerant passes through the second passageway 63b of the upstream-side heat exchanger 63, and the second refrigerant passes through the first passageway 63a of the upstream-side heat exchanger 63, such that the heat may be transferred between the first refrigerant and the second refrigerant.

Therefore, the second refrigerant may be cooled and condensed by the first refrigerant in the upstream-side heat exchanger 63. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. In the second refrigeration cycle 14, the second refrigerant is compressed by the second compressor 62, the compressed second refrigerant is primarily condensed by the condenser 73, the primarily condensed second refrigerant is secondarily condensed by the upstream-side heat exchanger 63, the secondarily condensed second refrigerant is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 12, in the first refrigeration cycle 21 of the HVAC sub-system 11, the first refrigerant is compressed by the first compressor 23, and the compressed first refrigerant is condensed by the interior heat exchanger 24 and the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The condensed first refrigerant may be expanded by the auxiliary expansion valve 53, and the expanded first refrigerant may be evaporated by the upstream-side heat exchanger 63. In the second refrigeration cycle 14, the second refrigerant may be compressed by the second compressor 62, the compressed second refrigerant may be sequentially condensed by the condenser 73 and the upstream-side heat exchanger 63, the condensed second refrigerant may be expanded by the expansion valve 64, and the expanded second refrigerant may be evaporated by the downstream-side heat exchanger 65. Therefore, the powertrain coolant primarily condenses the second refrigerant in the condenser 73, the first refrigerant secondarily condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

Figure 13:
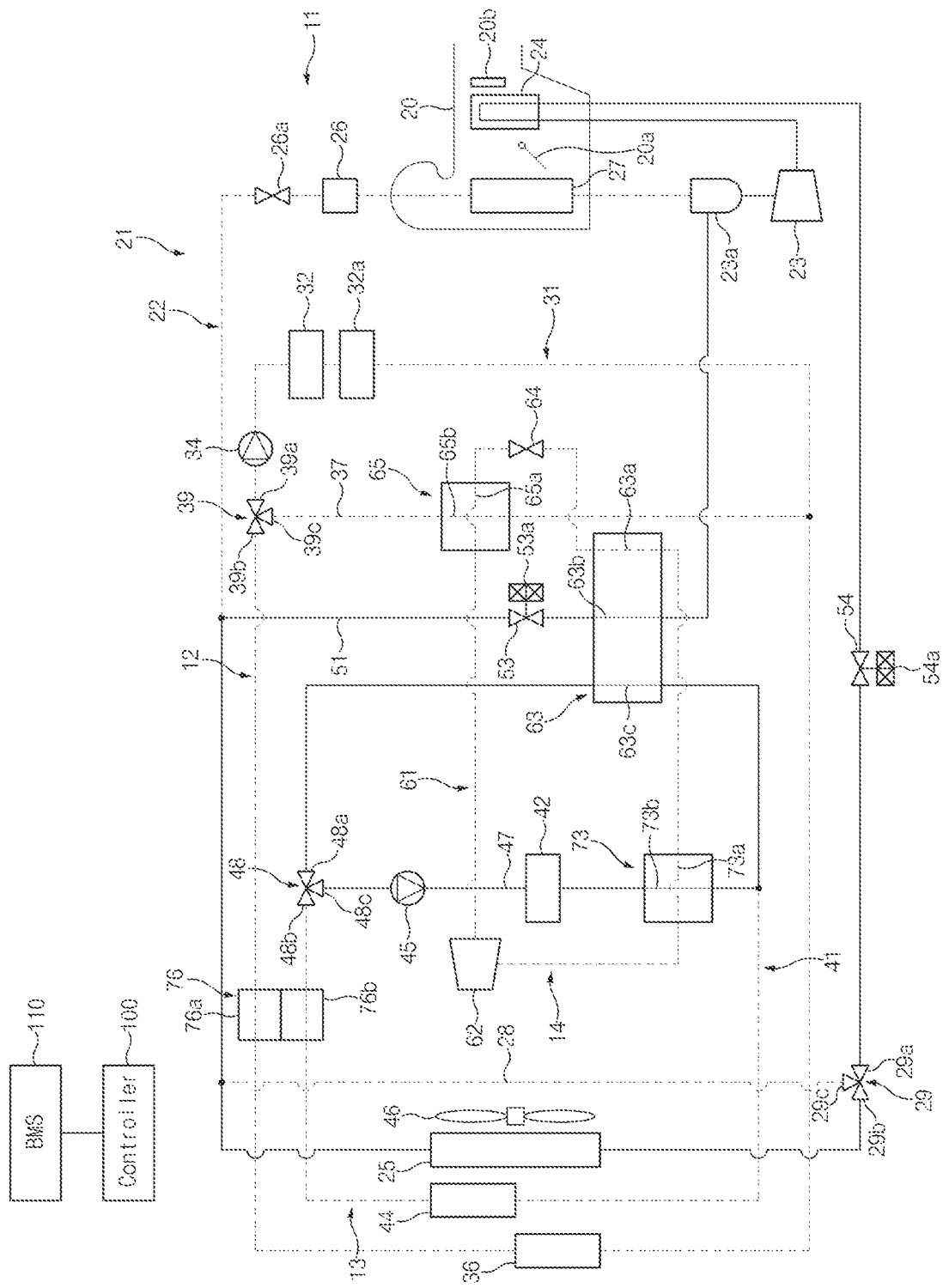
FIG. 13 is a view illustrating a state in which the battery is not cooled when the HVAC sub-system operates in the heating mode in the thermal management system for a vehicle illustrated in FIG. 8.

FIG. 13 is a view illustrating a state in which the battery 32 is not cooled when the HVAC sub-system 11 operates in the heating mode in the heating condition of the passenger compartment.

Referring to FIG. 13, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree.

In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated. As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53. The operation of the battery pump 34 of the battery cooling sub-system 12 is stopped, such that the battery coolant does not circulate through the battery coolant loop 31. The three-way valve 48 of the powertrain cooling sub-system 13 performs the switching operation so that the second port 48b is closed and the third port 48c communicates with the first port 48a, such that the powertrain coolant bypasses the powertrain radiator 44 and circulates through the powertrain component 42, the second passageway 73b of the condenser 73, and the third passageway 63c of the upstream-side heat exchanger 63 through the powertrain bypass conduit 47. The operation of the second compressor 62 is stopped, such that the second refrigerant does not circulate through the second refrigerant loop 61 of the second refrigeration cycle 14.

Figure 14:
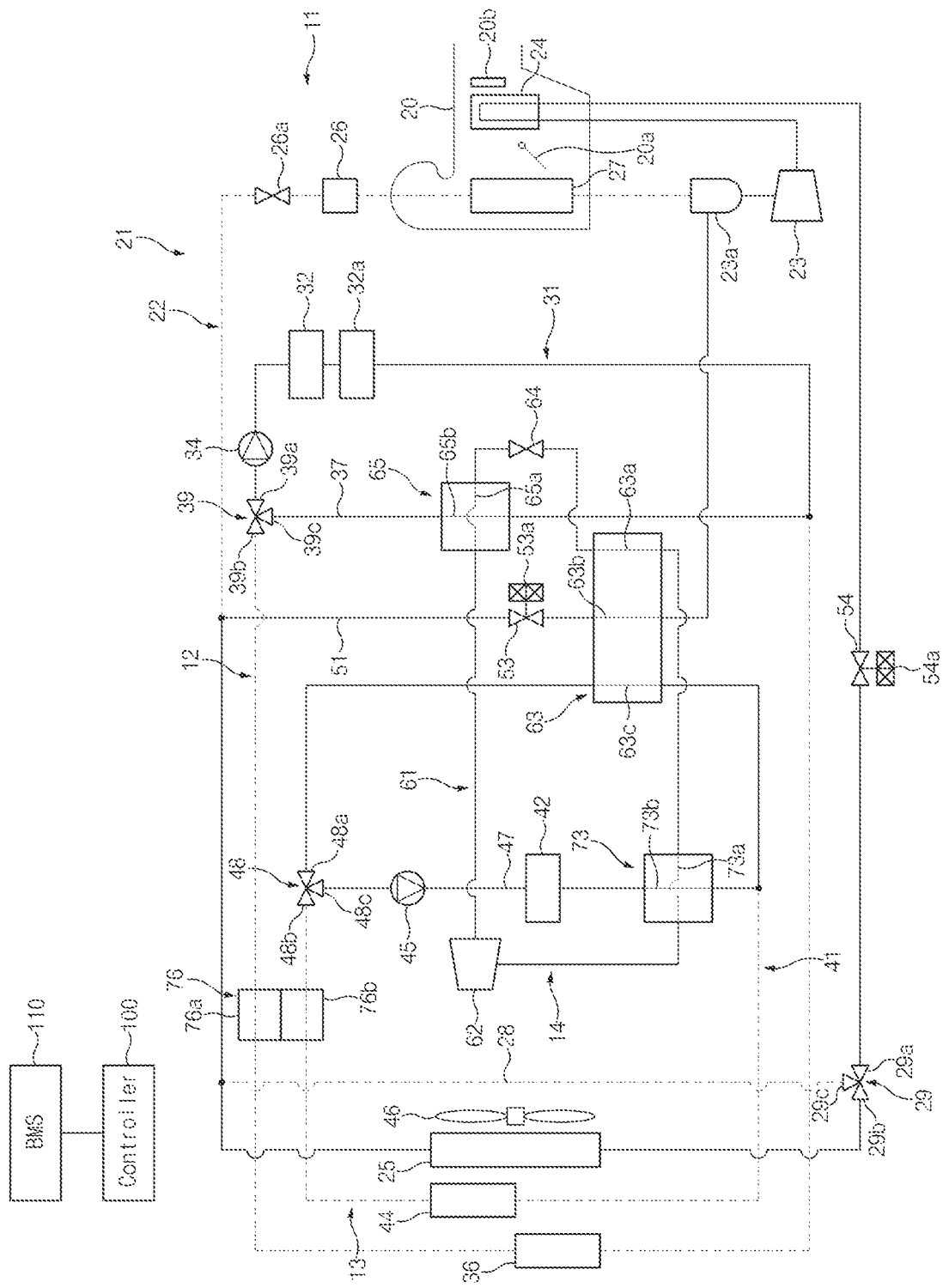
FIG. 14 is a view illustrating a state in which the battery is cooled by the battery cooling sub-system, the first refrigeration cycle, the second refrigeration cycle, and the powertrain cooling sub-system when the HVAC sub-system operates in the heating mode in the thermal management system for a vehicle illustrated in FIG. 8.

FIG. 14 is a view illustrating a state in which the battery 32 is cooled by the battery cooling sub-system 12, the first refrigeration cycle 21, the second refrigeration cycle 14, and the powertrain cooling sub-system 13 under the control of the controller 100 when the HVAC sub-system 11 operates in the heating mode in the heating condition of the passenger compartment.

Referring to FIG. 14, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree.

In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated. As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34.

The three-way valve 48 of the powertrain cooling sub-system 13 performs the switching operation so that the second port 48b is closed and the third port 48c communicates with the first port 48a. That is, the three-way valve 48 performs the switching operation and opens the outlet of the powertrain bypass conduit 47, such that the powertrain coolant bypasses the powertrain radiator 44, and the powertrain coolant circulates through the powertrain component 42, the second passageway 73b of the condenser 73, and the third passageway 63c of the upstream-side heat exchanger 63 through the powertrain bypass conduit 47. The powertrain coolant passes through the second passageway 73b of the condenser 73, and the second refrigerant passes through the first passageway 73a of the condenser 73, such that the heat may be transferred between the powertrain coolant and the second refrigerant. Therefore, the second refrigerant may be cooled and condensed by the powertrain coolant in the condenser 73. The first refrigerant passes through the second passageway 63b of the upstream-side heat exchanger 63, and the second refrigerant passes through the first passageway 63a of the upstream-side heat exchanger 63, such that the heat may be transferred between the first refrigerant and the second refrigerant. Therefore, the second refrigerant may be cooled and condensed by the first refrigerant in the upstream-side heat exchanger 63.

Referring to FIG. 14, in the first refrigeration cycle 21 of the HVAC sub-system 11, the first refrigerant is compressed by the first compressor 23, and the compressed first refrigerant is condensed by the interior heat exchanger 24. As the opening degree of the heating-side expansion valve 26 is adjusted, the condensed first refrigerant may be expanded by the heating-side expansion valve 26, and the expanded first refrigerant may be evaporated by the exterior heat exchanger 25.

In the second refrigeration cycle 14, the second refrigerant may be compressed by the second compressor 62, the compressed second refrigerant may be sequentially condensed by the condenser 73 and the upstream-side heat exchanger 63, the condensed second refrigerant may be expanded by the expansion valve 64, and the expanded second refrigerant may be evaporated by the downstream-side heat exchanger 65. Therefore, the powertrain coolant primarily condenses the second refrigerant in the condenser 73, the first refrigerant secondarily condenses the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

FIGS. 15 to 21 are views illustrating a thermal management system for a vehicle according to still another embodiment of the present disclosure.

Figure 15:
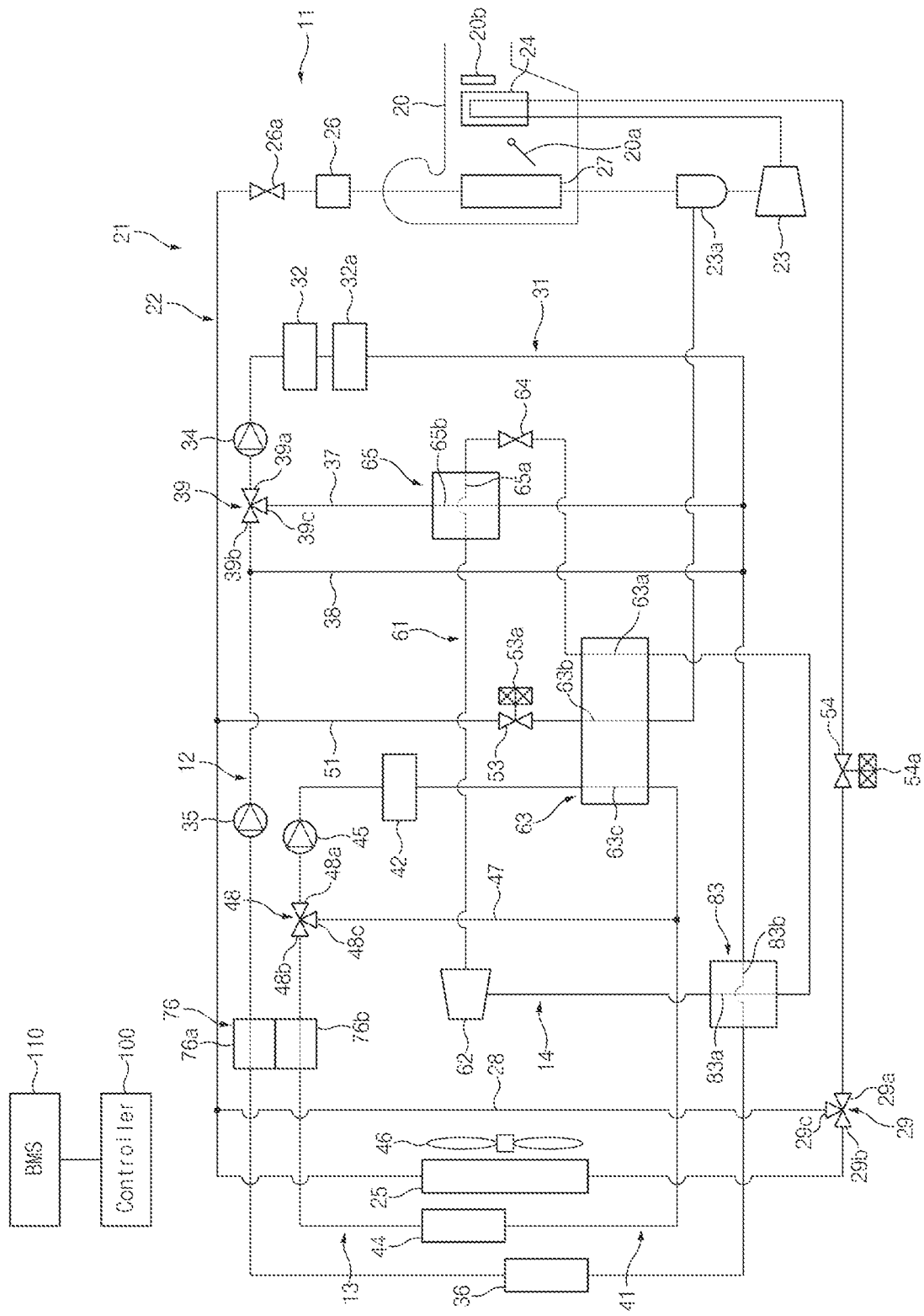
FIG. 15 is a view illustrating a thermal management system for a vehicle according to still another embodiment of the present disclosure.

Referring to FIG. 15, the second refrigeration cycle 14 may further include a condenser 83 positioned at a point between the second compressor 62 and the upstream-side heat exchanger 63. In particular, the condenser 83 may be positioned between the second compressor 62 and the upstream-side heat exchanger 63. The condenser 83 may be configured to thermally connect the second refrigeration cycle 14 and the battery cooling sub-system 12. Specifically, the condenser 83 may be configured to transfer the heat between the battery coolant circulating through the battery coolant loop 31 and the second refrigerant circulating through the second refrigerant loop 61. The condenser 83 may be configured to transfer the heat between the battery coolant loop 31 and the second refrigerant loop 61 of the second refrigeration cycle 14. The condenser 83 may include a first passageway 83a fluidly connected to the second refrigerant loop 61, and a second passageway 83b fluidly connected to the battery coolant loop 31. The first passageway 83a may be positioned at the upstream point of the first passageway 63a of the upstream-side heat exchanger 63. In particular, the first passageway 83a of the condenser 83 may be positioned between the second compressor 62 and the first passageway 63a of the upstream-side heat exchanger 63. The second passageway 83b may be fluidly connected to the battery coolant loop 31. The first passageway 83a is disposed in the condenser 83 so as to be adjacent to or in contact with the second passageway 83b, such that the first passageway 83a may be thermally connected to the second passageway 83b, and the first passageway 83a may be fluidly separated from the second passageway 83b. As described above, the condenser 83 is thermally connected to the battery coolant loop 31, such that the second refrigerant may be cooled and condensed by the battery coolant.

According to the embodiment illustrated in FIG. 15, the battery cooling sub-system 12 may further include an auxiliary battery bypass conduit 38 and an auxiliary battery pump 35 that are configured to allow the battery coolant to bypass the battery 32 and the second passageway 65b of the downstream-side heat exchanger 65. An inlet of the auxiliary battery bypass conduit 38 may be connected to a point between the outlet of the battery bypass conduit 37 and the outlet of the battery radiator 36. An outlet of the auxiliary battery bypass conduit 38 may be connected to a point between the inlet of the battery bypass conduit 37 and the inlet of the battery radiator 36. The battery bypass conduit 37 and the auxiliary battery bypass conduit 38 may be parallel to each other. The battery pump 34 may be fluidly connected to the first port 39a of the three-way valve 39, and the auxiliary battery pump 35 may be fluidly connected to the second port 39b of the three-way valve 39. When the three-way valve 29 performs the switching operation so that the second port 39b is closed and the third port 39c communicates with the first port 39a, the battery coolant flows from a downstream side of the battery radiator 36 to an upstream side of the battery radiator 36 through the auxiliary battery bypass conduit 38, such that the battery coolant may bypass the battery 32 and the second passageway 65b of the downstream-side heat exchanger 65. Therefore, the battery coolant passing through the auxiliary battery bypass conduit 38 may be allowed to flow sequentially through the battery radiator 36 and the battery reservoir 76a by the auxiliary battery pump 35.

According to the embodiment illustrated in FIG. 15, the second passageway 83b of the condenser 83 may be positioned at a point between the inlet of the battery radiator 36 and the outlet of the auxiliary battery bypass conduit 38.

In the second refrigeration cycle 14 according to the embodiment illustrated in FIG. 15, the second refrigerant is compressed by the second compressor 62, the compressed second refrigerant is condensed by the condenser 83 and/or the upstream-side heat exchanger 63, the condensed second refrigerant is expanded by the expansion valve 64, and the expanded second refrigerant is evaporated by the downstream-side heat exchanger 65.

Figure 16:
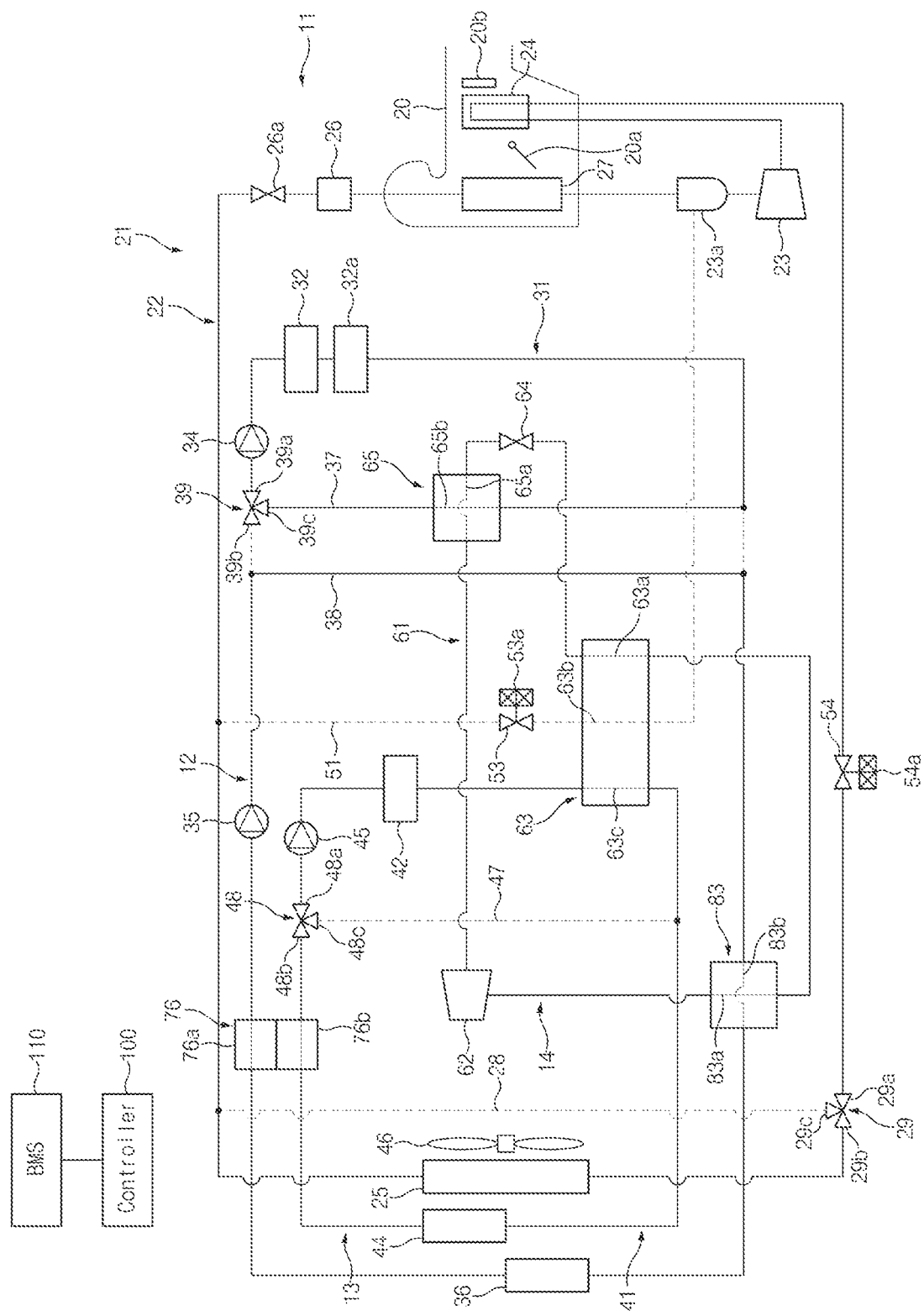
FIG. 16 is a view illustrating a state in which the battery is cooled by the second refrigeration cycle, the battery cooling sub-system, and the powertrain cooling sub-system, and the battery is cooled independently of the HVAC sub-system when the HVAC sub-system operates in the cooling mode in the thermal management system for a vehicle illustrated in FIG. 15.

FIG. 16 is a view illustrating a state in which the battery 32 is cooled by the second refrigeration cycle 14, the battery cooling sub-system 12, and the powertrain cooling sub-system 13 under the control of the controller 100, and the battery 32 is cooled independently of the HVAC sub-system 11 when the HVAC sub-system 11 operates in the cooling mode in the cooling condition of the passenger compartment.

Referring to FIG. 16, the three-way valve 48 of the powertrain cooling sub-system 13 performs the switching operation so that the third port 48c is closed and the second port 48b communicates with the first port 48a. That is, the three-way valve 48 performs the switching operation to close the outlet of the powertrain bypass conduit 47. The powertrain coolant passes through the third passageway 63c of the upstream-side heat exchanger 63, and the second refrigerant passes through the first passageway 63a of the upstream-side heat exchanger 63, such that the heat may be transferred between the powertrain coolant and the second refrigerant. Therefore, the second refrigerant may be cooled and condensed by the powertrain coolant in the upstream-side heat exchanger 63.

The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54. Because the auxiliary expansion valve 53 is closed and the first refrigerant does not pass through the second passageway 63b of the upstream-side heat exchanger 63, no heat is transferred between the second refrigerant and the first refrigerant in the upstream-side heat exchanger 63.

The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that a portion of the battery coolant may flow through the battery bypass conduit 37, bypass the auxiliary battery pump 35, the battery radiator 36, and the second passageway 83b of the condenser 83, and be circulated through the battery 32 and the second passageway 65b of the downstream-side heat exchanger 65 by the battery pump 34. The remaining portion of the battery coolant may flow through the auxiliary battery bypass conduit 38, bypass the battery pump 34, the battery 32, and the second passageway 65b of the downstream-side heat exchanger 65, and be circulated through the battery radiator 36 and the second passageway 83b of the condenser 83 by the auxiliary battery pump 35. The second refrigerant passes through the first passageway 83a of the condenser 83, and the battery coolant passes through the second passageway 83b of the condenser 83, such that the heat may be transferred between the battery coolant and the second refrigerant. Therefore, the second refrigerant may be cooled and condensed by the battery coolant in the condenser 83. The second refrigerant condensed by the condenser 83 and the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 16, in the first refrigeration cycle 21 of the HVAC sub-system 11, the first refrigerant may be compressed by the first compressor 23, the compressed first refrigerant may be condensed by the interior heat exchanger 24 and the exterior heat exchanger 25, the condensed first refrigerant may be expanded in the cooling-side expansion valve 26, and the expanded first refrigerant may be evaporated by the evaporator 27. In the second refrigeration cycle 14, the second refrigerant may be compressed by the second compressor 62, the compressed second refrigerant may be condensed by the condenser 83 and the upstream-side heat exchanger 63, the condensed second refrigerant may be expanded by the expansion valve 64, and the expanded second refrigerant may be evaporated by the downstream-side heat exchanger 65. Therefore, the battery coolant primarily condenses the second refrigerant in the condenser 83, the powertrain coolant secondarily condenses the second refrigerant in the upstream-side heat exchanger 63, the second refrigerant cools the battery coolant in the downstream-side heat exchanger 65, and the cooled battery coolant cools the battery 32, such that the performance in cooling the battery 32 may be significantly improved.

Figure 17:
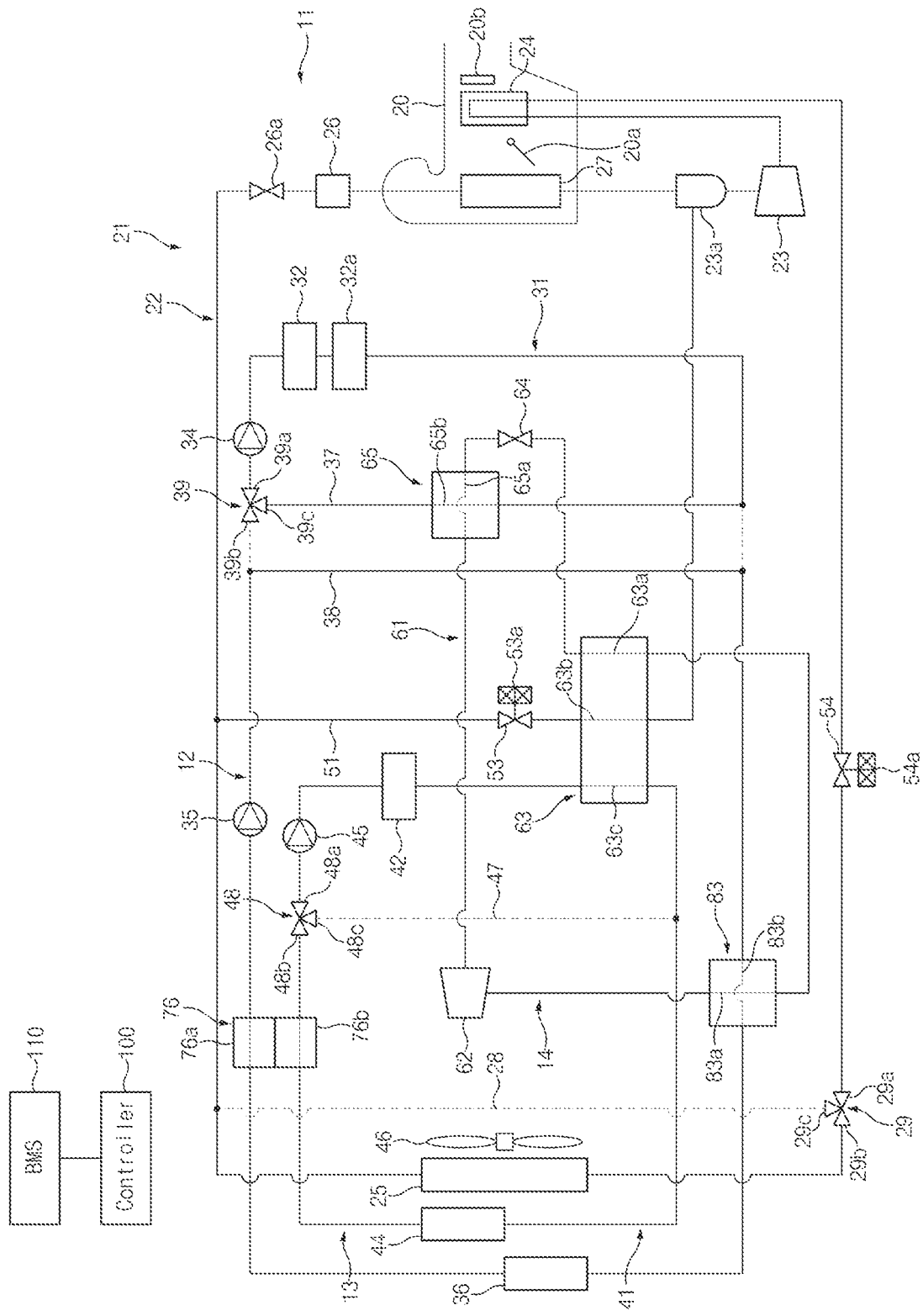
FIG. 17 is a view illustrating a state in which the battery is cooled by the first refrigeration cycle, the second refrigeration cycle, the battery cooling sub-system, and the powertrain cooling sub-system when the HVAC sub-system operates in the cooling mode in the thermal management system for a vehicle illustrated in FIG. 15.

FIG. 17 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 operates in the cooling mode in the cooling condition of the passenger compartment.

Referring to FIG. 17, the three-way valve 48 of the powertrain cooling sub-system 13 performs the switching operation so that the third port 48c is closed and the second port 48b communicates with the first port 48a. That is, the three-way valve 48 performs the switching operation to close the outlet of the powertrain bypass conduit 47. The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54.

The auxiliary expansion valve 53 is opened to have a predetermined opening degree, such that the first refrigerant is expanded by the auxiliary expansion valve 53, and the expanded first refrigerant passes through the second passageway 63b of the upstream-side heat exchanger 63. The second refrigerant passes through the first passageway 63a of the upstream-side heat exchanger 63, the first refrigerant passes through the second passageway 63b of the upstream-side heat exchanger 63, and the powertrain coolant passes through the third passageway 63c of the upstream-side heat exchanger 63, such that the heat may be transferred between the first refrigerant, the second refrigerant, and the powertrain coolant. Therefore, the second refrigerant may be cooled and condensed by the powertrain coolant and the first refrigerant in the upstream-side heat exchanger 63.

The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that a portion of the battery coolant may flow through the battery bypass conduit 37, bypass the auxiliary battery pump 35, the battery radiator 36, and the second passageway 83b of the condenser 83, and be circulated through the battery 32 and the second passageway 65b of the downstream-side heat exchanger 65 by the battery pump 34. The remaining portion of the battery coolant may flow through the auxiliary battery bypass conduit 38, bypass the battery pump 34, the battery 32, and the second passageway 65b of the downstream-side heat exchanger 65, and be circulated through the battery radiator 36 and the second passageway 83b of the condenser 83 by the auxiliary battery pump 35. The second refrigerant passes through the first passageway 83a of the condenser 83, and the battery coolant passes through the second passageway 83b of the condenser 83, such that the heat may be transferred between the battery coolant and the second refrigerant. Therefore, the second refrigerant may be cooled and condensed by the battery coolant in the condenser 83.

The second refrigerant condensed by the condenser 83 and the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 17, in the first refrigeration cycle 21 of the HVAC sub-system 11, the first refrigerant may be compressed by the first compressor 23, the compressed first refrigerant may be condensed twice by the interior heat exchanger 24 and the exterior heat exchanger 25, the condensed first refrigerant may be expanded by the cooling-side expansion valve 26 and the auxiliary expansion valve 53, and the expanded first refrigerant may be evaporated by the evaporator 27 and the upstream-side heat exchanger 63. In the second refrigeration cycle 14, the second refrigerant may be compressed by the second compressor 62, the compressed second refrigerant may be condensed by the condenser 83 and the upstream-side heat exchanger 63, the condensed second refrigerant may be expanded by the expansion valve 64, and the expanded second refrigerant may be evaporated by the downstream-side heat exchanger 65. Therefore, the battery coolant primarily condenses the second refrigerant in the condenser 83, the powertrain coolant and the first refrigerant secondarily condense the second refrigerant in the upstream-side heat exchanger 63, the second refrigerant cools the battery coolant in the downstream-side heat exchanger 65, and the cooled battery coolant cools the battery 32, such that the performance in cooling the battery 32 may be significantly improved.

Figure 18:
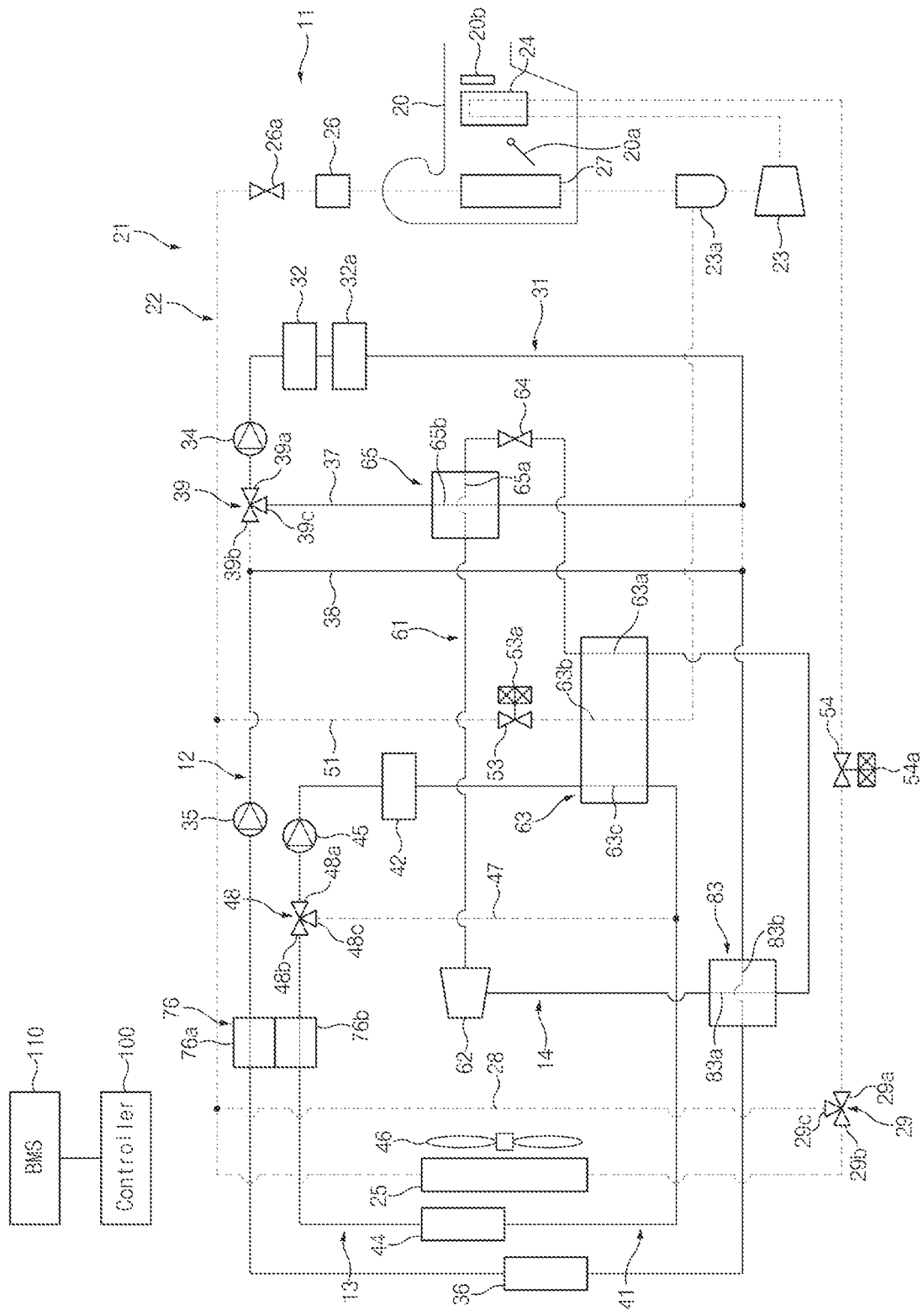
FIG. 18 is a view illustrating a state in which the battery is cooled by the second refrigeration cycle, the battery cooling sub-system, and the powertrain cooling sub-system when the first compressor of the HVAC sub-system does not operate in the thermal management system for a vehicle illustrated in FIG. 15.

FIG. 18 is a view illustrating a state in which the battery 32 is cooled by the battery cooling sub-system 12, the second refrigeration cycle 14, and the powertrain cooling sub-system 13 under the control of the controller 100 when the first compressor 23 of the HVAC sub-system 11 does not operate.

Referring to FIG. 18, the three-way valve 48 of the powertrain cooling sub-system 13 performs the switching operation so that the third port 48c is closed and the second port 48b communicates with the first port 48a. That is, the three-way valve 48 performs the switching operation to close the outlet of the powertrain bypass conduit 47. The powertrain coolant passes through the third passageway 63c of the upstream-side heat exchanger 63, and the second refrigerant passes through the first passageway 63a of the upstream-side heat exchanger 63, such that the heat may be transferred between the second refrigerant and the powertrain coolant. Therefore, the second refrigerant may be cooled and condensed by the powertrain coolant in the upstream-side heat exchanger 63.

The operation of the first compressor 23 of the HVAC sub-system 11 is stopped, such that the first refrigerant does not circulate through the first refrigeration cycle 21. The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that a portion of the battery coolant may flow through the battery bypass conduit 37, bypass the auxiliary battery pump 35, the battery radiator 36, and the second passageway 83b of the condenser 83, and be circulated through the battery 32 and the second passageway 65b of the downstream-side heat exchanger 65 by the battery pump 34. The remaining portion of the battery coolant may flow through the auxiliary battery bypass conduit 38, bypass the battery pump 34, the battery 32, and the second passageway 65b of the downstream-side heat exchanger 65, and be circulated through the battery radiator 36 and the second passageway 83b of the condenser 83 by the auxiliary battery pump 35. The second refrigerant passes through the first passageway 83a of the condenser 83, and the battery coolant passes through the second passageway 83b of the condenser 83, such that the heat may be transferred between the battery coolant and the second refrigerant. Therefore, the second refrigerant may be cooled and condensed by the battery coolant in the condenser 83.

The second refrigerant condensed by the condenser 83 and the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 18, in the second refrigeration cycle 14, the second refrigerant may be compressed by the second compressor 62, the compressed second refrigerant may be condensed by the condenser 83 and the upstream-side heat exchanger 63, the condensed second refrigerant may be expanded by the expansion valve 64, and the expanded second refrigerant may be evaporated by the downstream-side heat exchanger 65. Therefore, the battery coolant primarily condenses the second refrigerant in the condenser 83, the powertrain coolant secondarily condenses the second refrigerant in the upstream-side heat exchanger 63, the second refrigerant cools the battery coolant in the downstream-side heat exchanger 65, and the cooled battery coolant cools the battery 32, such that the performance in cooling the battery 32 may be significantly improved.

Figure 19:
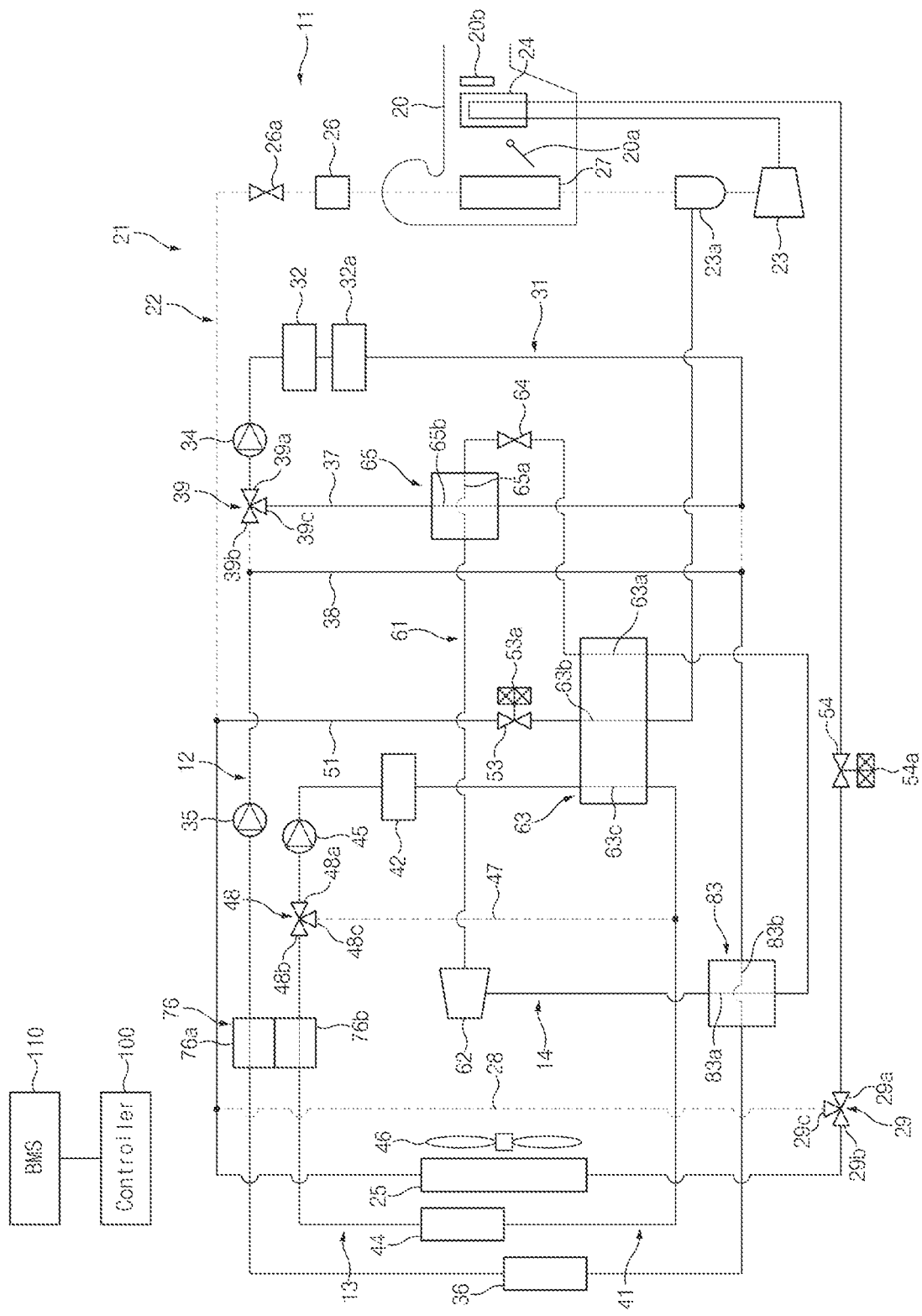
FIG. 19 is a view illustrating a state in which the battery is cooled by the first refrigeration cycle, the second refrigeration cycle, the battery cooling sub-system, and the powertrain cooling sub-system when the HVAC sub-system does not operate in the cooling mode and the heating mode in the thermal management system for a vehicle illustrated in FIG. 15.

FIG. 19 is a view illustrating a state in which the battery 32 is cooled by the first refrigeration cycle 21, the second refrigeration cycle 14, the battery cooling sub-system 12, and the powertrain cooling sub-system 13 under the control of the controller 100 when the HVAC sub-system 11 does not operate in the cooling mode and the heating mode.

Referring to FIG. 19, the on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The three-way valve 48 of the powertrain cooling sub-system 13 performs the switching operation so that the third port 48c is closed and the second port 48b communicates with the first port 48a. That is, the three-way valve 48 performs the switching operation to close the outlet of the powertrain bypass conduit 47. The three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant circulates through the exterior heat exchanger 25. Further, the heating-side expansion valve 54 is fully opened so that the opening degree thereof is 100%, such that the first refrigerant is not expanded by the heating-side expansion valve 54. The auxiliary expansion valve 53 is opened to have a predetermined opening degree, such that the first refrigerant is expanded by the auxiliary expansion valve 53, and the expanded first refrigerant passes through the second passageway 63b of the upstream-side heat exchanger 63. The second refrigerant passes through the first passageway 63a of the upstream-side heat exchanger 63, the first refrigerant passes through the second passageway 63b of the upstream-side heat exchanger 63, and the powertrain coolant passes through the third passageway 63c of the upstream-side heat exchanger 63, such that the heat may be transferred between the first refrigerant, the second refrigerant, and the powertrain coolant. Therefore, the second refrigerant may be cooled and condensed by the powertrain coolant and the first refrigerant in the upstream-side heat exchanger 63.

The three-way valve 39 of the battery cooling sub-system 12 performs the switching operation so that the second port 39b is closed and the third port 39c communicates with the first port 39a. That is, the three-way valve 39 performs the switching operation and opens the inlet of the battery bypass conduit 37, such that a portion of the battery coolant may flow through the battery bypass conduit 37, bypass the auxiliary battery pump 35, the battery radiator 36, and the second passageway 83b of the condenser 83, and be circulated through the battery 32 and the second passageway 65b of the downstream-side heat exchanger 65 by the battery pump 34. The remaining portion of the battery coolant may flow through the auxiliary battery bypass conduit 38, bypass the battery pump 34, the battery 32, and the second passageway 65b of the downstream-side heat exchanger 65, and be circulated through the battery radiator 36 and the second passageway 83b of the condenser 83 by the auxiliary battery pump 35. The second refrigerant passes through the first passageway 83a of the condenser 83, and the battery coolant passes through the second passageway 83b of the condenser 83, such that the heat may be transferred between the battery coolant and the second refrigerant. Therefore, the second refrigerant may be cooled and condensed by the battery coolant in the condenser 83.

The second refrigerant condensed by the condenser 83 and the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 19, in the first refrigeration cycle 21 of the HVAC sub-system 11, the first refrigerant is compressed by the first compressor 23, and the compressed first refrigerant is condensed by the interior heat exchanger 24 and the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. The condensed first refrigerant may be expanded by the auxiliary expansion valve 53, and the expanded first refrigerant may be evaporated by the upstream-side heat exchanger 63. In the second refrigeration cycle 14, the second refrigerant may be compressed by the second compressor 62, the compressed second refrigerant may be condensed sequentially by the condenser 83 and the upstream-side heat exchanger 63, the condensed second refrigerant may be expanded by the expansion valve 64, and the expanded second refrigerant may be evaporated by the downstream-side heat exchanger 65. Therefore, the battery coolant primarily condenses the second refrigerant in the condenser 83, the powertrain coolant and the first refrigerant secondarily condense the second refrigerant in the upstream-side heat exchanger 63, the second refrigerant cools the battery coolant in the downstream-side heat exchanger 65, and the cooled battery coolant cools the battery 32, such that the performance in cooling the battery 32 may be significantly improved.

Figure 20:
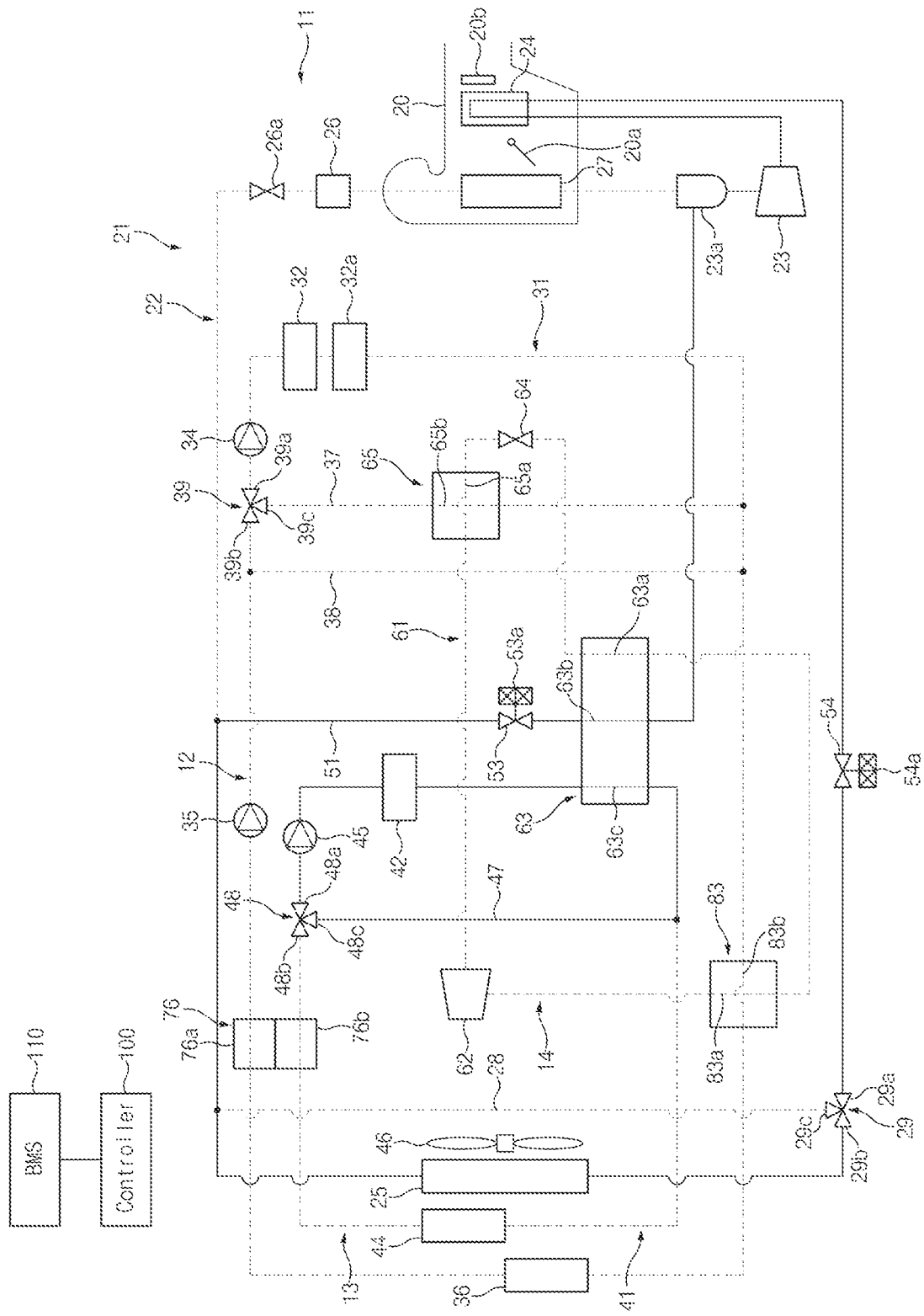
FIG. 20 is a view illustrating a state in which the battery is not cooled when the HVAC sub-system operates in the heating mode in the thermal management system for a vehicle illustrated in FIG. 15.

FIG. 20 is a view illustrating a state in which the battery 32 is not cooled when the HVAC sub-system 11 operates in the heating mode in the heating condition of the passenger compartment.

Referring to FIG. 20, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree. In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated. As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53.

The operations of the battery pump 34 of the battery cooling sub-system 12 and the auxiliary battery pump 35 are stopped, such that the battery coolant does not circulate through the battery cooling sub-system 12. The three-way valve 48 of the powertrain cooling sub-system 13 performs the switching operation so that the second port 48b is closed and the third port 48c communicates with the first port 48a, such that the powertrain coolant bypasses the powertrain radiator 44 and circulates through the powertrain component 42 and the third passageway 63c of the upstream-side heat exchanger 63 through the powertrain bypass conduit 47. The operation of the second compressor 62 is stopped, such that the second refrigerant does not circulate through the second refrigerant loop 61 of the second refrigeration cycle 14.

Figure 21:
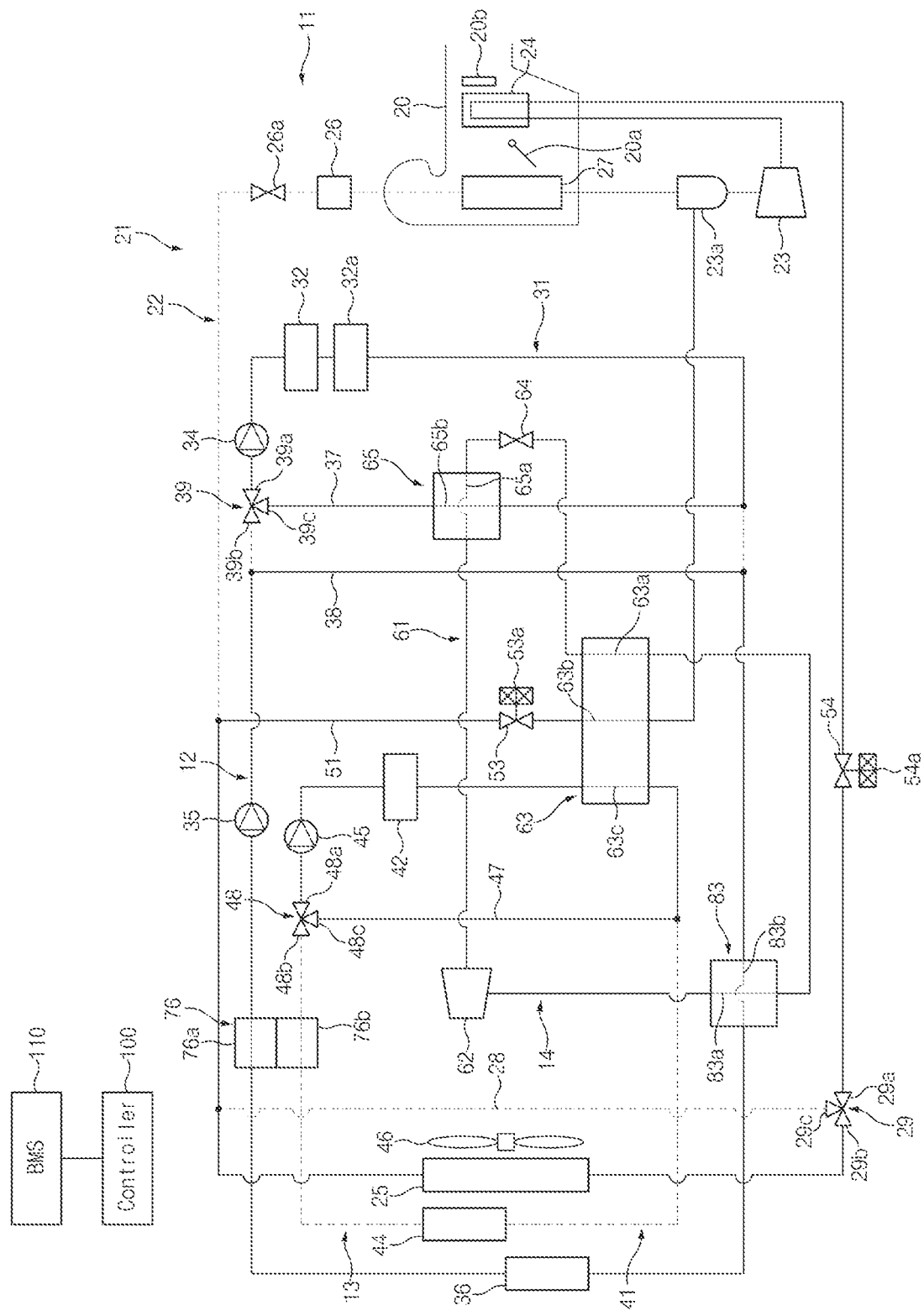
FIG. 21 is a view illustrating a state in which the battery is cooled by the battery cooling sub-system, the first refrigeration cycle, the second refrigeration cycle, and the powertrain cooling sub-system when the HVAC sub-system operates in the heating mode in the thermal management system for a vehicle illustrated in FIG. 15.

FIG. 21 is a view illustrating a state in which the battery 32 is cooled by the battery cooling sub-system 12, the first refrigeration cycle 21, the second refrigeration cycle 14, and the powertrain cooling sub-system 13 under the control of the controller 100 when the HVAC sub-system 11 operates in the heating mode in the heating condition of the passenger compartment.

Referring to FIG. 21, the three-way valve 29 of the HVAC sub-system 11 performs the switching operation so that the third port 29c is closed and the second port 29b communicates with the first port 29a. That is, the three-way valve 29 performs the switching operation and closes the inlet of the bypass conduit 28, such that the first refrigerant may pass through the exterior heat exchanger 25, and the first refrigerant may be evaporated by the outside air in the exterior heat exchanger 25. The on-off valve 26a of the cooling-side expansion valve 26 is closed, such that the first refrigerant may flow only into the auxiliary expansion valve 53 and the upstream-side heat exchanger 63 through the distribution conduit 51 without flowing into the evaporator 27. Therefore, the heating-side expansion valve 54 may be opened and adjusted to have a predetermined opening degree. In the first refrigeration cycle 21 of the HVAC sub-system 11, the first refrigerant is compressed by the first compressor 23, the compressed first refrigerant is condensed by the interior heat exchanger 24, and the air passing through the interior heat exchanger 24 is heated by the interior heat exchanger 24, such that the passenger compartment is heated.

As the opening degree of the heating-side expansion valve 54 is adjusted, the first refrigerant is expanded by the heating-side expansion valve 54, the expanded first refrigerant is evaporated by the exterior heat exchanger 25, and the evaporated first refrigerant flows into the first compressor 23 via the auxiliary expansion valve 53 and the upstream-side heat exchanger 63. In this case, the auxiliary expansion valve 53 is fully opened so that the opening degree of the auxiliary expansion valve 53 is 100%, such that the first refrigerant is not expanded by the auxiliary expansion valve 53. The three-way valve 39 of the battery cooling sub-system 12 performs the switching operation so that the second port 39b is closed and the third port 39c communicates with the first port 39a. That is, the three-way valve 39 performs the switching operation and opens the outlet of the battery bypass conduit 37, such that the battery coolant may flow through the battery bypass conduit 37 while bypassing the battery radiator 36, and the battery coolant may be circulated through the battery 32 and the second passageway 65b of the downstream-side heat exchanger 65 by the battery pump 34. The second refrigerant passes through the first passageway 83a of the condenser 83, and the battery coolant passes through the second passageway 83b of the condenser 83, such that the heat may be transferred between the battery coolant and the second refrigerant. Therefore, the second refrigerant may be cooled and condensed by the battery coolant in the condenser 83.

The three-way valve 39 of the battery cooling sub-system 12 performs the switching operation so that the second port 39b is closed and the third port 39c communicates with the first port 39a. That is, the three-way valve 48 performs the switching operation and opens the outlet of the powertrain bypass conduit 47, such that the powertrain coolant bypasses the powertrain radiator 44, and the powertrain coolant circulates through the powertrain component 42 and the third passageway 63c of the upstream-side heat exchanger 63 through the powertrain bypass conduit 47. The second refrigerant passes through the first passageway 63a of the upstream-side heat exchanger 63, the first refrigerant passes through the second passageway 63b of the upstream-side heat exchanger 63, and the powertrain coolant passes through the third passageway 63c of the upstream-side heat exchanger 63, such that the heat may be transferred between the first refrigerant, the second refrigerant, and the powertrain coolant. Therefore, the second refrigerant may be cooled and condensed by the powertrain coolant and the first refrigerant in the upstream-side heat exchanger 63.

The second refrigerant condensed by the condenser 83 and the upstream-side heat exchanger 63 is expanded by the expansion valve 64, and the expanded second refrigerant passes through the first passageway 65a of the downstream-side heat exchanger 65, such that the second refrigerant cools the battery coolant in the downstream-side heat exchanger 65. Further, the cooled battery coolant may cool the battery 32.

Referring to FIG. 21, in the first refrigeration cycle 21 of the HVAC sub-system 11, the first refrigerant is compressed by the first compressor 23, and the compressed first refrigerant is condensed by the interior heat exchanger 24. As the opening degree of the heating-side expansion valve 26 is adjusted, the condensed first refrigerant may be expanded by the heating-side expansion valve 26, and the expanded first refrigerant may be evaporated by the exterior heat exchanger 25. In the second refrigeration cycle 14, the second refrigerant may be compressed by the second compressor 62, the compressed second refrigerant may be sequentially condensed by the condenser 83 and the upstream-side heat exchanger 63, the condensed second refrigerant may be expanded by the expansion valve 64, and the expanded second refrigerant may be evaporated by the downstream-side heat exchanger 65. Therefore, the battery coolant primarily condenses the second refrigerant in the condenser 83, the powertrain coolant and the first refrigerant secondarily condense the second refrigerant in the upstream-side heat exchanger 63, the second refrigerant cools the battery coolant in the downstream-side heat exchanger 65, and the cooled battery coolant cools the battery 32, such that the performance in cooling the battery coolant and the battery 32 may be significantly improved.

The above description is simply given for illustratively describing the technical spirit of the present disclosure, and those skilled in the art to which the present disclosure pertains will appreciate that various changes and modifications are possible without departing from the essential characteristic of the present disclosure.

Therefore, the embodiments disclosed in the present disclosure are provided for illustrative purposes only but not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

The invention claimed is:

1. A thermal management system for a vehicle, the thermal management system comprising:
    a first refrigeration cycle thermally connected to a passenger compartment and comprising a first refrigerant loop;
    a battery cooling sub-system thermally connected to a battery and comprising a battery coolant loop;
    a powertrain cooling sub-system thermally connected to a powertrain component and comprising a powertrain coolant loop; and
    a second refrigeration cycle thermally connected to the first refrigeration cycle and the battery cooling sub-system, and comprising a second refrigerant loop;
    wherein the second refrigeration cycle comprises:
    an upstream-side heat exchanger configured to selectively transfer heat between the first refrigerant loop and the second refrigerant loop; and
    a downstream-side heat exchanger configured to transfer heat between the battery coolant loop and the second refrigerant loop;
    wherein the upstream-side heat exchanger is configured to selectively transfer heat between the first refrigerant loop, the second refrigerant loop, and the powertrain coolant loop; and
    wherein the upstream-side heat exchanger comprises a first passageway fluidly connected to the second refrigerant loop, a second passageway fluidly connected to the first refrigerant loop, and a third passageway fluidly connected to the powertrain coolant loop.

2. The thermal management system of claim 1, wherein the first refrigeration cycle comprises:
    a first compressor;
    an interior heat exchanger positioned at a downstream side of the first compressor;
    an exterior heat exchanger positioned at a downstream side of the interior heat exchanger;
    a cooling-side expansion valve positioned at a downstream side of the exterior heat exchanger;
    an evaporator positioned at a downstream side of the cooling-side expansion valve; and
    a heating-side expansion valve positioned between the interior heat exchanger and the exterior heat exchanger.

3. The thermal management system of claim 2, wherein the first refrigeration cycle comprises a distribution conduit configured to connect an upstream point of the cooling-side expansion valve and a downstream point of the evaporator;
  wherein the upstream-side heat exchanger is configured to transfer heat between the distribution conduit and the second refrigerant loop;
  wherein the second passageway of the upstream-side heat exchanger is fluidly connected to the distribution conduit; and
  wherein the first refrigeration cycle further comprises an auxiliary expansion valve disposed in the distribution conduit and positioned at an upstream point of the second passageway of the upstream-side heat exchanger.

4. The thermal management system of claim 1, wherein the downstream-side heat exchanger comprises a first passageway fluidly connected to the second refrigerant loop, and a second passageway fluidly connected to the battery coolant loop.

5. The thermal management system of claim 1, wherein the second refrigeration cycle comprises:
  a second compressor positioned at an upstream point of the upstream-side heat exchanger; and
  an expansion valve positioned between the upstream-side heat exchanger and the downstream-side heat exchanger.

6. The thermal management system of claim 1, wherein the battery cooling sub-system comprises:
  a battery radiator fluidly connected to the battery coolant loop;
  a battery bypass conduit configured to connect an upstream point and a downstream point of the battery radiator; and
  a three-way valve disposed in the battery bypass conduit and configured to adjust a flow direction of a battery coolant.

7. A thermal management system for a vehicle, the thermal management system comprising:
  a first refrigeration cycle thermally connected to a passenger compartment;
  a battery cooling sub-system thermally connected to a battery;
  a powertrain cooling sub-system thermally connected to a powertrain component;
  a second refrigeration cycle thermally connected to the first refrigeration cycle and the battery cooling sub-system; and
  a controller configured to control the first refrigeration cycle, the second refrigeration cycle, and the battery cooling sub-system to transfer heat between the first refrigeration cycle, the second refrigeration cycle, and the battery cooling sub-system in accordance with a cooling condition of the passenger compartment, a heating condition of the passenger compartment, and a temperature of the battery;
  wherein the second refrigeration cycle comprises an upstream-side heat exchanger configured to selectively transfer heat between the first refrigeration cycle, the second refrigeration cycle, and the powertrain cooling sub-system; and
  wherein the upstream-side heat exchanger comprises a first passageway fluidly connected to the second refrigeration cycle, a second passageway fluidly connected to the first refrigeration cycle, and a third passageway fluidly connected to the powertrain cooling sub-system.

8. The thermal management system of claim 7, wherein the first refrigeration cycle comprises a first compressor configured to circulate a first refrigerant;
  wherein the second refrigeration cycle comprises a second compressor configured to circulate a second refrigerant; and
  wherein the second refrigeration cycle comprises a downstream-side heat exchanger configured to thermally connect the battery cooling sub-system and the second refrigeration cycle.

9. The thermal management system of claim 8, wherein the controller is configured to control the first refrigeration cycle, the second refrigeration cycle, and the battery cooling sub-system so that in a cooling condition of the passenger compartment, the first refrigerant is circulated in a cooling mode by the first compressor, a cooling-side expansion valve, and an evaporator, the second refrigerant is circulated by the second compressor, heat is transferred between the first refrigeration cycle and the second refrigeration cycle through the upstream-side heat exchanger, and heat is transferred between the second refrigeration cycle and the battery cooling sub-system through the downstream-side heat exchanger.

10. The thermal management system of claim 8, wherein the controller is configured to control the first refrigeration cycle, the second refrigeration cycle, and the battery cooling sub-system so that in a heating condition of the passenger compartment, the first refrigerant is circulated in a heating mode by the first compressor, a heating-side expansion valve, and an exterior heat exchanger, the second refrigerant is circulated by the second compressor, heat is transferred between the first refrigeration cycle and the second refrigeration cycle through the upstream-side heat exchanger, and heat is transferred between the second refrigeration cycle and the battery cooling sub-system through the downstream-side heat exchanger.

* * * * *